(12) United States Patent
Ben Gigi et al.

(10) Patent No.: US 11,972,671 B2
(45) Date of Patent: *Apr. 30, 2024

(54) SYSTEM AND METHOD FOR PRE-DROWNING AND DROWNING DETECTION

(71) Applicant: MAIGUARD AI DETECTION SYSTEMS LTD, Paralimni (CY)

(72) Inventors: Ilan Ben Gigi, Limassol (CY); Himant Gupta, Limassol (CY)

(73) Assignee: MAIGUARD AI DETECTION SYSTEM LTD, Parlimni (CY)

( * ) Notice: Subject to any disclaimer, the term of this patent is extended or adjusted under 35 U.S.C. 154(b) by 0 days.

This patent is subject to a terminal disclaimer.

(21) Appl. No.: 18/168,137

(22) Filed: Feb. 13, 2023

(65) Prior Publication Data

US 2023/0186749 A1    Jun. 15, 2023

Related U.S. Application Data

(63) Continuation-in-part of application No. 17/866,888, filed on Jul. 18, 2022, now Pat. No. 11,580,838.

(60) Provisional application No. 63/223,098, filed on Jul. 19, 2021.

(51) Int. Cl.
| | |
|---|---|
| *G08B 21/08* | (2006.01) |
| *G06V 10/25* | (2022.01) |
| *G06V 10/82* | (2022.01) |
| *G06V 20/05* | (2022.01) |
| *G06V 20/52* | (2022.01) |
| *G06V 40/10* | (2022.01) |

(52) U.S. Cl.
CPC ............ *G08B 21/08* (2013.01); *G06V 10/25* (2022.01); *G06V 10/82* (2022.01); *G06V 20/05* (2022.01); *G06V 20/52* (2022.01); *G06V 40/10* (2022.01)

(58) Field of Classification Search
None
See application file for complete search history.

(56) References Cited

U.S. PATENT DOCUMENTS

| | | | |
|---|---|---|---|
| 6,133,838 A | 10/2000 | Meniere | |
| RE43,492 E | 6/2012 | Wills et al. | |
| 9,033,557 B2 | 5/2015 | Potucek et al. | |
| 9,084,314 B2 | 7/2015 | Conover et al. | |
| 10,718,507 B2 | 7/2020 | Potucek et al. | |
| 11,580,838 B1 * | 2/2023 | Ben Gigi | G08B 21/08 |
| 2012/0086780 A1 | 4/2012 | Sharma | |
| 2019/0034712 A1 | 1/2019 | Golan et al. | |

(Continued)

FOREIGN PATENT DOCUMENTS

| | | |
|---|---|---|
| AU | 2013270529 | 1/2014 |
| AU | 2015271887 | 1/2016 |

(Continued)

OTHER PUBLICATIONS

Additional International Search Report of Application No. PCT/IB2022/056566 mailed on Oct. 4, 2022.

(Continued)

*Primary Examiner* — Leon Flores
(74) *Attorney, Agent, or Firm* — Stephen E. Zweig

(57) ABSTRACT

System and method for detection of pre-drowning and drowning events based on underwater and exterior images in and around a swimming area.

15 Claims, 24 Drawing Sheets

(56) References Cited

U.S. PATENT DOCUMENTS

| | | | |
|---|---|---|---|
| 2019/0287378 A1 | 9/2019 | Rogers et al. | |
| 2020/0053320 A1 | 2/2020 | Mor et al. | |
| 2020/0394804 A1* | 12/2020 | Barton | G06V 10/82 |

FOREIGN PATENT DOCUMENTS

| | | | |
|---|---|---|---|
| CA | 2670557 | | 6/2008 |
| EP | 2087280 | | 8/2009 |
| EP | 2383508 | | 4/2011 |
| EP | 4091146 | A1 | 11/2022 |
| ES | 2670809 | | 3/2018 |
| ES | 2691029 | | 7/2018 |
| WO | WO 2017/130187 | | 8/2017 |
| WO | WO 2020031170 | A1 | 2/2020 |

OTHER PUBLICATIONS https://urldefense.proofpoint.com/v2/url?u=https-3A__www.angeleye.tech_en_en-2Dpatented-2Dunderwater-2Dled-2Dcamera_&d=DwlDaQ&c=euGZstcaTDllvimEN8b7jXrwqOf-v5A_CdpgnVfiiMM&r=8l08XTGAGrLLnwdrEJ0rbqfhMSTIv32-Od5paKHAJF8&m=xRcZnKLWeNHI8Lz2Fp7BO4bl_jUNijNnZYGCgag0-yl&s=w0mjmWCHOAQv05U_SIpNV5wx95t6ey052hgUj4aUGEY&e= downloaded on May 31, 2021 AngelEye underwater camera with integrated LED light system: patented innovation. Press Release Feb. 18, 2021 Downloaded on May 31, 2021.
https://urldefense.proofpoint.com/v2/url?u=https-3A__swimeye.com_&d=DwlDaQ&c=euGZstcaTDllvimEN8b7jXrwqOf-v5A_CdpgnVfiiMM&r=8l08XTGAGrLLnwdrEJ0rbqfhMSTIv32-Od5paKHAJF8&m=xRcZnKLWeNHI8Lz2Fp7BO4bl_jUNijNnZYGCgag0-yl&s=W6KuHqXwACMIRVOx4RvFse6iFjkuT7jDf7ztOGHeOLc&e= downloaded on May 31, 2021 SwimEye saves lives; A drowning detection and prevention system; Downloaded on May 31, 2021.
https://urldefense.proofpoint.com/v2/url?u=https-3A__poseidon-2Dtech.com_en-2DGB_https-3A__drowningprevention.com.au_&d=DwlDaQ&c=euGZstcaTDllvimEN8b7jXrwqOf-v5A_CdpgnVfiiMM&r=8l08XTGAGrLLnwdrEJ0rbqfhMSTIv32-Od5paKHAJF8&m=xRcZnKLWeNHI8Lz2Fp7BO4bl_jUNijNnZYGCgag0-yl&s=cczO08E4w7VZJwsTIJZfX_jCoQ-WaeNzld4yPzoRDoQ&e= downloaded on May 31, 2021 Poseidon—Drowning Detection System for Swimming Pools (Poseidon-tech-com).
https://drowningprevention.com.au/.
Hayward LED; 160 & 320, ColorLogic and CrystaLogic 1.5 LED Lights; Owner's Manual.
Ex Parte Quayle Action for U.S. Appl. No. 17/866,888 mailed Sep. 22, 2022.

\* cited by examiner

SYSTEM AND METHOD FOR PRE-DROWNING AND DROWNING DETECTION

CROSS-REFERENCE TO RELATED APPLICATIONS

This application is a continuation-in-part of U.S. patent application Ser. No. 17/866,888 filed Jul. 18, 2022 now U.S. Pat. No. 11,580,838, which claims the benefit of U.S. Provisional Application No. 63/223,098 filed Jul. 19, 2021; all of which are incorporated herein by reference in their entirety.

FIELD OF THE INVENTION

The present invention relates to the field of systems and methods for pre-drowning and drowning detection, and more particularly, to artificial intelligence (AI)-based systems and methods thereof.

BACKGROUND OF THE INVENTION

The number of deaths caused by drowning in residential pools is continuously increasing worldwide. Current systems for detection of pool drowning events are typically expensive, occupy significant space in an area around the pool, have high false alarm rates and poor night vision, live view streaming and communications capabilities.

There is a long-felt need for a low-cost, robust, compact system for detecting pre-drowning and drowning events in pools, for example in residential pools, with low false alarm ratio and enhanced night vision, live view streaming, charging and communication capabilities.

SUMMARY OF THE INVENTION

In one aspect, the invention is embodied as a method of pre-drowning and drowning detection based on underwater images, comprising: capturing, by at least one camera installed in a pool below a waterline, a plurality of images; receiving, by a main control unit, the plurality of images from the at least one camera; obtaining, by the main control unit, coordinates of a virtual safety line in the images, wherein the virtual safety line is indicative of the waterline in the pool; detecting, by the main control unit, in an image of the plurality of images, one or more human bodies; tracking, by the main control unit, in the plurality of images, the one or more human bodies to determine, for each human body of the one or more human bodies, a position and orientation of the respective human body with respect to the virtual safety line and a measure of motion of the respective human body; determining, by the main control unit, for each of the one or more human bodies, based on a first subset of images of the plurality of images, based on the tracking of the respective human body and based on a predefined set of rules, whether the respective human body is suspicious of undergoing a pre-drowning event or a drowning event; determining, by the main control unit, for each human body that is suspicious of undergoing the pre-drowning event or the drowning event, based on a second subset of images of the plurality of images, based on the tracking of the respective human body and the predefined set of rules, whether the respective human body is undergoing the pre-drowning event or the drowning event.

The method may further comprise causing, by the main control unit, an alarm unit to issue an alarm upon the determination that at least one of the one or more human bodies undergoes the pre-drowning event or the drowning event.

The method may further comprise sending, by the main control unit, upon the determination that at least one of the one or more human bodies undergoes the pre-drowning event or the drowning event, a respective notification to a remote control unit.

The method may further comprise receiving, by a remote control unit, an image from the at least one camera; receiving, by the remote control unit, from a user, a selection of two horizontally opposite points on a pool's water fill line marking in the image; determining, by the remote control unit, coordinates of the virtual safety line extending between the two horizontally opposite points in the image; and sending the coordinates of the virtual safety line to the main control unit.

The method may further comprise detecting the one or more human bodies by: detecting, by the main control unit, in the image of the plurality of images, two or more body parts; and determining, which of the two or more detected body parts, belong to the same human body.

Such method may comprise defining, by the main control unit, two or more body part bounding boxes, each body part bounding box bounds one of the two or more detected body parts; defining, by the main control unit, one or more body bounding boxes, each body bounding box bounds one of the one or more detected human bodies; calculating, by the main control unit, overlaps between the two or more defined body part bounding boxes with respect to each other and with the one or more body bounding boxes in the image; and determining, by the main control unit, that two or more body parts of the detected body parts belong to one human body of the one or more detected human bodies if the two or more respective body part bounding boxes have a maximal overlap with each other and with the respective body bounding box as compared to overlaps of other body part bounding boxes of the two or more body part bounding boxes with each other and with other body bounding boxes of the one or more body bounding boxes.

The method may further comprise determining the two or more body parts using a pre-trained artificial intelligence (AI) body parts detection model.

The method may further comprise an AI body parts detection model that comprises a neural network, and the method further may comprise pre-training the neural network using: a first set of positive underwater images containing body parts of human bodies at different possible positions and orientations; a second set of negative underwater images containing no body parts; and a third set of augmented positive and augmented negative underwater images.

The method may further comprise defining, by the main control unit, one or more body bounding boxes, each body bounding box bounds one of the one or more detected human bodies; tracking, by the main control unit, each of the one or more detected human bodies in the first subset of subsequent images of the plurality of images by determining, for each human body of the one or more detected human bodies, that the respective body bounding box in each two subsequent images of the first subset belongs to the respective human body if: the respective body bounding boxes in the respective two subsequent images have a maximal overlap with each other as compared to overlaps between other body bounding boxes in the images, and an overlap between the respective body bounding boxes in the respective two subsequent images is above a specified threshold.

The method may further comprise detecting, by the main control unit, in the image of the plurality of images, two or more body parts; determining, by the main control unit, that the two or more detected body parts belong to the same human body; selecting, by the main control unit, according to a predefined body parts priority list, a pair of body parts including a first body part and a second body part of the two or more detected body parts; defining, by the main control unit, a first body part bounding box that bounds the first body part and a second body part bounding box that bounds the second body part in the image; calculating, by the main control unit, a first centroid point of the first body part bounding box and a second centroid point of the second body part bounding box in the image; determining, by the main control unit, an angle between (i) a line extending between the first centroid point and the second centroid point, and (ii) a virtual horizontal line in the image; and determining, by the main control unit, based on the determined angle, an orientation of the human body in the image.

The method may further comprise determining that the respective human body is suspicious of undergoing the pre-drowning event if: a head of the respective human body is detectable in the images of the first subset and the head is below the virtual safety line in the images; an orientation of the respective human body in the images of the first subset is substantially vertical; a measure of motion of the respective human body in a vertical direction is greater than a measure of motion of the respective human body in a horizontal direction in the images of the first subset; and a total measure of motion of the respective human body in the images of the first subset is below a predefined motion threshold.

The method may further comprise determining that the respective human body is suspicious of undergoing the drowning event if: an orientation of the respective human body in the images of the first subset is substantially horizontal; the respective human body is below the virtual safety line in the images of the first subset; and a total measure of motion of the respective human body in the images of the first subset is below a predefined motion threshold.

The method may further comprise determining that the respective human body is suspicious of undergoing the drowning event if: only one body part of the respective human body is detectable in the images of the first subset; a vertical distance between that body part and the virtual safety line is above a predefined distance threshold in the images of the first subset; and a total measure of motion of that body part in the images of the first subset is below a predefined motion threshold.

The method may further comprise: sharing, by a remote control unit, a wireless internet connection having predefined identification parameters, wherein the main control unit is configured to automatically connect to the shared wireless internet connection using the predefined identification parameters; selecting, by the remote control unit, a wireless local area network (WLAN) to which the main control unit to be connected; connecting, by the remote control unit, the main control unit to the selected WLAN.

In another embodiment, the invention may comprise a system for pre-drowning and drowning detection based on underwater images, the system comprising: at least one camera configured to be installed in a pool below a waterline and to capture a plurality of images; a main control unit configured to: receive the plurality of images from the at least one camera; obtain coordinates of a virtual safety line in the images, wherein the virtual safety line is indicative of the waterline in the pool; detect, in an image of the plurality of images, one or more human bodies; track, in the plurality of images, the one or more human bodies to determine, for each human body of the one or more human bodies, a position and orientation of the respective human body with respect to the virtual safety line and a measure of motion of the respective human body; determine, for each of the one or more human bodies, based on a first subset of images of the plurality of images, based on the tracking of the respective human body and a predefined set of rules, whether or not the respective human body is suspicious of undergoing a pre-drowning event or a drowning event; and determine, by the main control unit, for each human body that is suspicious of undergoing the pre-drowning event or the drowning event, based on a second subset of images of the plurality of images, based on the tracking of the respective human body and the predefined set of rules, whether or not the respective human body is undergoing the pre-drowning event or the drowning event.

The system may comprise an alarm unit configured to issue an alarm, wherein the main control unit is configured to cause the alarm unit to issue the alarm upon the determination that at least one of the one or more human bodies undergoes the pre-drowning event or the drowning event.

The system may comprise a remote control unit, wherein the main control unit is configured, upon the determination that at least one of the one or more human bodies undergoes the pre-drowning event or the drowning event, to send a respective notification to the remote control unit.

The system may comprise a remote control unit configured to: receive an image from the at least one camera; receive, from a user, a selection of two horizontally opposite points on a pool's water fill line marking in the image; determine coordinates of the virtual safety line extending between the two horizontally opposite points in the image; and send the coordinates of the virtual safety line to the main control unit.

The system may comprise a main control unit further configured to detect the one or more human bodies by detecting, in the image of the plurality of images, two or more body parts; and determining, which of the two or more detected body parts, belong to the same human body.

The system may comprise A main control unit is further configured to: define, by the main control unit, two or more body part bounding boxes, each body part bounding box bounds one of the two or more detected body parts; define, by the main control unit, one or more body bounding boxes, each body bounding box bounds one of the one or more detected human bodies; calculate, by the main control unit, overlaps between the two or more defined body part bounding boxes with respect to each other and with the one or more body bounding boxes in the image; and determine, by the main control unit, that two or more body parts of the detected body parts belong to one human body of the one or more detected human bodies if the two or more respective body part bounding boxes have a maximal overlap with each other and with the respective body bounding box as compared to overlaps of other body part bounding boxes of the two or more body part bounding boxes with each other and with other body bounding boxes of the one or more body bounding boxes.

The system may comprise a main control unit configured to determine the two or more body parts using a pre-trained artificial intelligence (AI) body parts detection model.

The system may comprise an AI body parts detection model comprising a neural network pre-trained using: a first set of positive underwater images containing body parts of human bodies at different possible positions and orientations; a second set of negative underwater images containing no body parts; and a third set of augmented positive and augmented negative underwater images.

In embodiments, the main control unit is further configured to: define one or more body bounding boxes, each body bounding box bounds one of the one or more detected human bodies; track each of the one or more detected human bodies in the first subset of subsequent images of the plurality of images by determining, for each human body of the one or more detected human bodies, that the respective body bounding box in each two subsequent images of the first subset belongs to the respective human if: the respective body bounding boxes in the respective two subsequent images have a maximal overlap with each other as compared to overlaps between other body bounding boxes in the images, and an overlap between the respective body bounding boxes in the respective two subsequent images is above a specified threshold.

In embodiments, the main control unit is further configured to: detect, in the image of the plurality of images, two or more body parts; determine that the two or more detected body parts belong to the same human body; select, according to a predefined body parts priority list, a pair of body parts including a first body part and a second body part of the two or more detected body parts; define, a first body part bounding box that bounds the first body part and a second body part bounding box that bounds the second body part in the image; calculate a first centroid point of the first body part bounding box and a second centroid point of the second body part bounding box in the image; determine an angle between (i) a line extending between the first centroid point and the second centroid point, and (ii) a virtual horizontal line in the image; and determine, based on the determined angle, an orientation of the human body in the image.

In embodiments, the main control unit is further configured to determine that the respective human body is suspicious of undergoing the pre-drowning event if: ahead of the respective human body is detectable in the images of the first subset and the head is below the virtual safety line in the images; an orientation of the respective human body in the images of the first subset is substantially vertical; a measure of motion of the respective human body in a vertical direction is greater than a measure of motion of the respective human body in a horizontal direction in the images of the first subset; and a total measure of motion of the respective human body in the images of the first subset is below a predefined motion threshold.

In embodiments, the main control unit is further configured to determine that the respective human body is suspicious of undergoing the drowning event if: an orientation of the respective human body in the images of the first subset is substantially horizontal; the respective human body is below the virtual safety line in the images of the first subset; and a total measure of motion of the respective human body in the images of the first subset is below a predefined motion threshold.

In embodiments, the main control unit is further configured to determine that the respective human body is suspicious of undergoing the drowning event if: only one body part of the respective human body is detectable in the images of the first subset; a vertical distance between that body part and the virtual safety line is above a predefined distance threshold in the images of the first subset; and a total measure of motion of that body part in the images of the first subset is below a predefined motion threshold.

The system may comprise a remote control unit configured to: share a wireless internet connection having predefined identification parameters, wherein the main control unit is configured to automatically connect to the shared wireless internet connection using the predefined identification parameters; select a wireless local area network (WLAN) to which the main control unit to be connected; connect the main control unit to the selected WLAN.

In another aspect, the invention may comprise a method of detecting one or more human bodies in an underwater image, the method comprising: receiving, by a processing unit, an image by a camera installed in a pool below a waterline; detecting, by the processing unit, using a pre-trained artificial intelligence (AI) body parts detection model, two or more body parts in the image; determining, by the processing unit, two or more body parts of the detected two or more body parts that belong to the same human body; and detecting the one or more human bodies in the image based on the determination.

In embodiments, the AI body parts detection model comprises a neural network and the method further comprises pre-training the neural network using: a first set of positive underwater images containing body parts of human bodies at different possible positions and orientations; a second set of negative underwater images containing no body parts; and a third set of augmented positive and augmented negative underwater images.

In embodiments, the method further comprises: defining, by the main control unit, two or more body part bounding boxes, each body part bounding box bounds one of the two or more detected body parts; defining, by the main control unit, one or more body bounding boxes, each body bounding box bounds one of the one or more detected human bodies; calculating, by the main control unit, overlaps between the two or more defined body part bounding boxes with respect to each other and with the one or more body bounding boxes in the image; and determining, by the main control unit, that two or more body parts of the detected body parts belong to one human body of the one or more detected human bodies if the two or more respective body part bounding boxes have a maximal overlap with each other and with the respective body bounding box as compared to overlaps of other body part bounding boxes of the two or more body part bounding boxes with each other and with other body bounding boxes of the one or more body bounding boxes.

A method according to the invention may comprise connecting a computing device to a wireless local area network using a remote computing device, the method comprising: sharing, by a remote computing device, a wireless internet connection having predefined identification parameters, wherein a computing device is configured to automatically connect to the shared wireless internet connection using the predefined identification parameters; selecting, by the remote computing device, a wireless local area network (WLAN) to which the computing device to be connected; connecting, by the remote computing device, the computing device to the selected WLAN.

Some embodiments of the present invention may provide a camera for pre-drowning and drowning detection in an underwater environment, the camera may include: a controller configured to: in an image of a plurality of images captured by the camera, detect a human body; in the plurality of images, track the human body; based a first subset of the plurality of images, the tracking and a predefined set of rules, determine whether or not the human body is suspicious of undergoing a pre-drowning event or a drowning event; and based on a second subset of images, the tracking and the predefined set of rules, determine whether or not the human body is undergoing the pre-drowning event or the drowning event.

In some embodiments, the controller is included in the electronic circuitry of the camera.

In some embodiments, the camera is an IP camera configured to be connected to a local area network router wirelessly or using a cable.

In some embodiments, the controller is configured to control an alarm unit to issue an alarm upon determination that the human body is undergoing the pre-drowning event or the drowning event.

In some embodiments, the controller is configured to transmit a notification about the determination that the human body is undergoing the pre-drowning event or the drowning event to a remote computing device.

In some embodiments, a remote computing device is connectable to the camera by reading a machine-readable optical label disposed on the camera.

In some embodiments, the controller is configured to track the human body by determining a position and orientation of the human body with respect to a virtual safety line indicative of a waterline in a pool and a measure of motion of the human body.

In some embodiments, the controller is configured to detect the human body in the image by detecting two or more body parts and determining that the two or more body parts belong to the same human body.

In some embodiments, the controller is configured to detect the two or more human body parts by providing the image as an input to a pretrained artificial intelligence (AI) model.

In some embodiments, the controller is configured to determine that the human body is suspicious of undergoing the pre-drowning event if: a head of the human body is detectable in the images of the first subset and the head is below a virtual safety line in the images of the first subset, the virtual safety line being indicative of a waterline in a pool; an orientation of the human body in the images of the first subset is substantially vertical; a measure of motion of the human body in a vertical direction is greater than a measure of motion of the human body in a horizontal direction in the images of the first subset; and a total measure of motion of the human body in the images of the first subset is below a predefined motion threshold.

In some embodiments, the controller is configured to determine that the human body is suspicious of undergoing the drowning event if: an orientation of the human body in the images of the first subset is substantially horizontal; the human body is below a virtual safety line in the images of the first subset, the virtual line being indicative of a waterline in a pool; and a total measure of motion of the human body in the images of the first subset is below a predefined motion threshold.

In some embodiments, the controller is configured to determine that the human body is suspicious of undergoing the drowning event if: only one body part of the human body is detectable in the images of the first subset; a vertical distance between that body part and a virtual safety line is above a predefined distance threshold in the images of the first subset, the virtual line being indicative of a waterline in a pool; and a total measure of motion of that body part in the images of the first subset is below a predefined motion threshold.

Some embodiments of the present invention may include a system for pre-drowning and drowning detection, the system may include: a first camera configured to be installed externally to a pool and to capture a plurality of first images; a second camera configured to be installed in the pool below a waterline and to capture a plurality of second images; and at least one controller configured to: (i) based on a subset of images of the plurality of first images, determine whether or not a human body has got closer than a predefined distance to a virtual safety line indicative of a perimeter of the pool; and (ii) based on a subset of images of the plurality of second images, determine whether or not a human body is undergoing a pre-drowning event or a drowning event.

In some embodiments, the at least one controller includes a controller included in electronic circuitry of the first camera, the controller being configured to determine whether or not the human body has got closer than the predefined distance to the virtual safety line indicative of the perimeter of the pool.

In some embodiments, the at least one controller includes a controller included in electronic circuitry of the second camera, the controller being configured to determine whether or not the human body is undergoing the pre-drowning event or the drowning event.

In some embodiments, the system includes an alarm unit configured to issue an alarm when at least one of: it is determined that the human body has got closer than the predefined distance to the virtual safety line indicative of the perimeter of the pool; and it is determined that the human body is undergoing the pre-drowning event or the drowning event.

Some embodiments of the present invention may provide a method of pre-drowning and drowning detection in an underwater environment, the method may include: providing executable code to a controller of the camera; and by the controller, executing the executable code to: in an image of a plurality of images captured by the camera, detect a human body; in the plurality of images, track the human body; based a first subset of the plurality of images, the tracking and a predefined set of rules, determine whether or not the human body is suspicious of undergoing a pre-drowning event or a drowning event; and based on a second subset of images, the tracking and the predefined set of rules, determine whether or not the human body is undergoing the pre-drowning event or the drowning event.

In some embodiments, the method includes connecting the camera to a local area network router wirelessly or using a cable.

In some embodiments, the method includes, by the controller, controlling an alarm unit to issue an alarm if it is determined that the human body is undergoing the pre-drowning event or the drowning event.

In some embodiments, the method includes, by the controller, transmitting to a remote computing device a notification that the human body is undergoing the pre-drowning event or the drowning event.

BRIEF DESCRIPTION OF THE DRAWINGS

For a better understanding of embodiments of the invention and to show how the same can be carried into effect, reference will now be made, purely by way of example, to the accompanying drawings in which like numerals designate corresponding elements or sections throughout.

In the accompanying drawings.

Figure 1A:
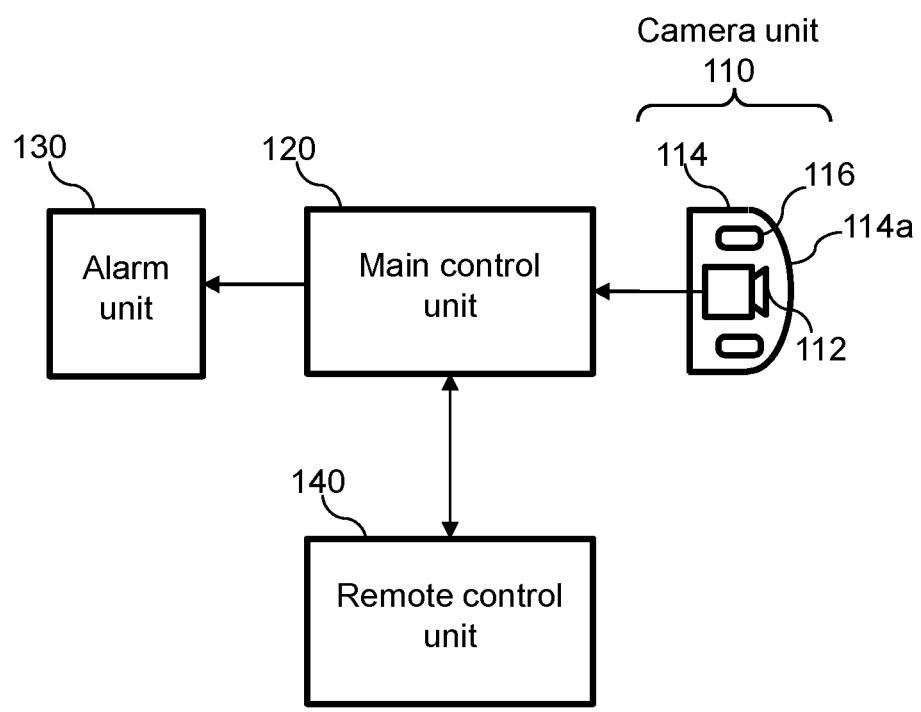
FIGS. 1A, 1B and 1C are schematic block diagrams of a system for pre-drowning and drowning detection, according to some embodiments of the invention.

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention are described. For purposes of explanation, specific configurations and details are set forth in order to provide a thorough understanding of the present invention. However, it will also be apparent to one skilled in the art that the present invention can be practiced without the specific details presented herein. Furthermore, well known features can have been omitted or simplified in order not to obscure the present invention. With specific reference to the drawings, it is stressed that the particulars shown are by way of example and for purposes of illustrative discussion of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention can be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that can be practiced or carried out in various ways as well as to combinations of the disclosed embodiments. Also, it is to be understood that the phraseology and terminology employed herein is for the purpose of description and should not be regarded as limiting.

Unless specifically stated otherwise, as apparent from the following discussions, it is appreciated that throughout the specification discussions utilizing terms such as "processing", "computing", "calculating", "determining", "enhancing" or the like, refer to the action and/or processes of a computer or computing system, or similar electronic computing device (e.g. such as computing device 900 described below with respect to FIG. 9), that manipulates and/or transforms data represented as physical, such as electronic, quantities within the computing system's registers and/or memories into other data similarly represented as physical quantities within the computing system's memories, registers or other such information storage, transmission or display devices. Any of the disclosed modules or units can be at least partially implemented by a computer processor.

Figure 1B:
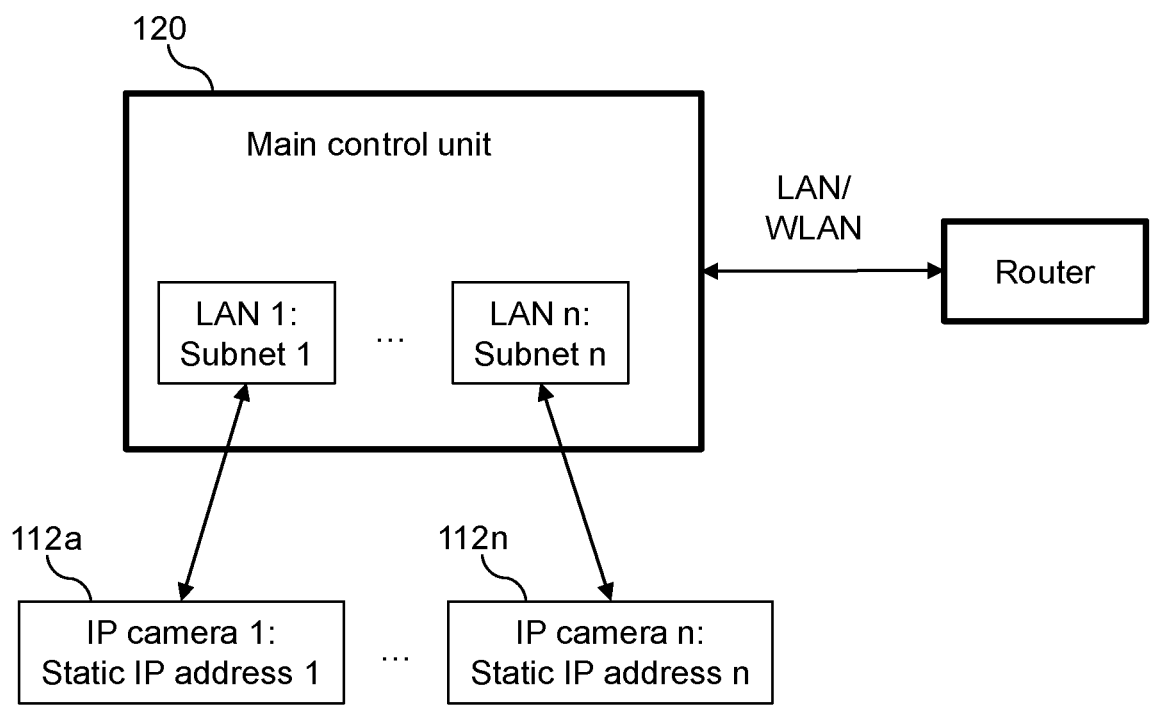
Figure 1C:
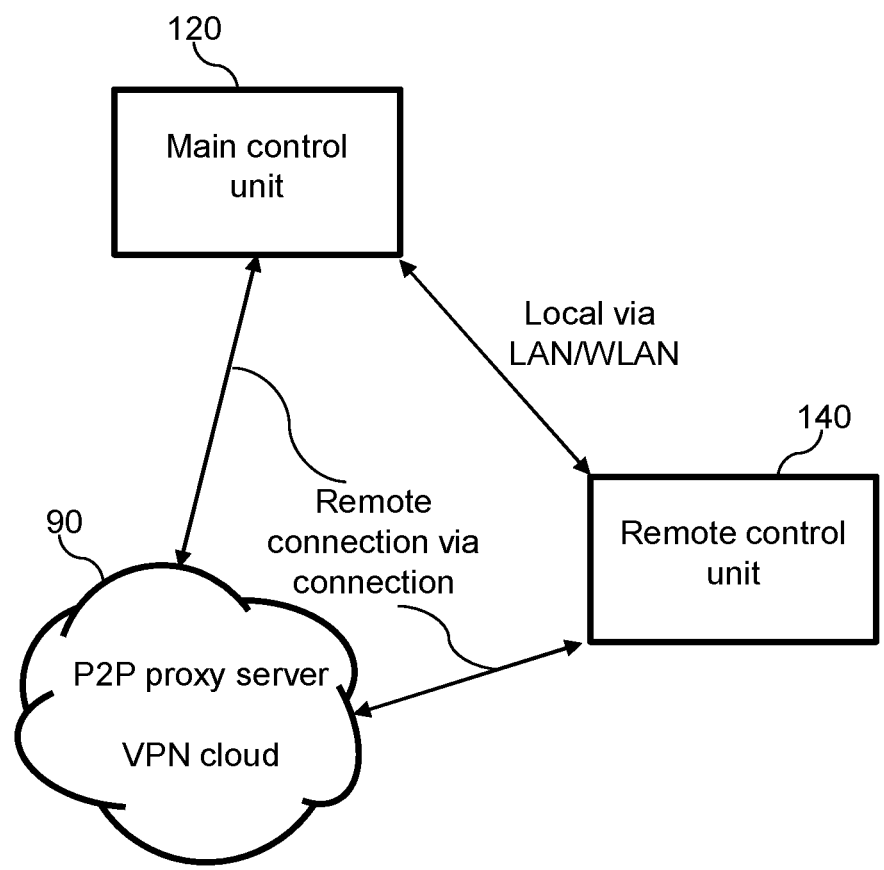

Reference is now made to FIGS. 1A, 1B and 1C, which are schematic block diagrams of a system 100 for pre-drowning and drowning detection, according to some embodiments of the invention. Elements and modules of FIGS. 1A, 1B and 1C may be or may be executed by a computer system such as shown in the example of FIG. 9.

According to some embodiments of the invention, system 100 may include a camera unit 110, a main control unit 120, an alarm unit 130 and a remote control unit 140.

Camera unit 110 may be configured to be installed in a pool below a waterline. Camera 110 may include a camera 112 configured to capture a plurality of images (e.g., underwater images). Camera 112 may stream the captured images to main control unit 120.

In some embodiments, camera unit 110 may include a waterproof housing 114 having a glass surface 114a through which camera 112 may capture the images. In some embodiments, glass surface 114a of waterproof housing 114 may be coated with an anti-fingerprint coating (e.g., to avoid formation of bubbles on glass surface 114a). In some embodiments, glass surface 114a of waterproof housing 114 may include an anti-reflective glass (e.g., to reduce water reflection effect).

In some embodiments, camera unit 110 may include one or more light-emitting diodes (LED) arrays 116 (e.g., to enhance night vision capabilities of camera 112). In some embodiments, camera 112 may include an infrared-cut filter.

In some embodiments, camera unit 110 may be replaceable with existing lightning assembly in the pool.

In some embodiments, camera 112 may be directly connected to main unit 120. For example, camera 112 may be connected to main unit 120 using a high-speed universal serial bus (USB) cable, optionally with amplifier integrated circuits. In another example, camera 112 may be connected to main unit 120 using an ethernet cable. Direct connection of camera 112 to main control unit 120 has several advantages over a connection thereof via a local area network (LAN) or a wireless LAN (WLAN). For example, direct connection may increase the stream speed of the captured images from camera 112 to main control unit 120, as compared to connection via LAN or WLAN. Direct connection of camera 112 to main control unit 120 may be, for example, safer as compared to connection via LAN or WLAN. In some embodiments, camera 112 may be an IP camera.

In some embodiments, main unit 120 may be included within a housing of camera 112. In some embodiments, main unit 120 may be included in the electronic circuitry of camera 112. In some embodiments, main unit 120 may be part of the electronic circuitry of camera 112.

In some embodiments, system 100 may include two or more camera units 110, wherein camera 112 of each of two or more camera units 110 may be directly connected to main control unit 120. For example, FIG. 1B schematically shows main control unit 120 having its ethernet connections defined with multiple separate subnets, and multiple IP cameras 112a ... 112n, each having a static IP address and connected to a specific subnet of the multiple subnets on main control unit 120. This exemplary architecture (e.g., shown in FIG. 1B) may, for example, ensure that IP cameras 112a ... 112n can be accessed by main control unit 120 locally with their respective IP addresses.

Main control unit 120 may be installed, for example, in a vicinity of the pool. Main control unit 120 may receive the images being captured by camera 112 of camera unit 110. Main control unit 120 may detect and track, in the received images, one or more human bodies (e.g., as described below with respect to FIG. 2, FIGS. 4A, 4B, 4C, 4D, FIGS. 5A, 5B and FIGS. 6A, 6B). Main control unit 120 may determine, based on the received images and a predetermined set of rules, whether or not at least one of the one or more human bodies undergoes a pre-drowning or a drowning event (e.g., as described below with respect to FIG. 2 and FIGS. 7A, 7B, 7C, 7D, 7E). Main control unit 120 control alarm unit 130 to issue an alarm upon determination of the pre-drowning or the drowning event. In some embodiments, alarm unit 130 is a radiofrequency (RF)-based alarm unit. In some embodiments, main control unit 120 may include an RF transmitter configured to activate RF-based alarm unit 130. Main control unit 120 may send a notification concerning the determination of the pre-drowning or the drowning event to remote control unit 140.

Main control unit 120 may, for example, include a single circuit board device that includes a main processing unit such as e.g., central processing unit (CPU), graphical processing unit (GPU), floating point unit (FPU), vision processing unit (VPU), artificial intelligence (AI) accelerator, etc.

Main control unit 120 may, for example, include a primary memory (e.g., RAM) and a secondary memory such as, e.g., embedded MultiMediaCard (eMMC), secure digital (SD) card, etc.

Main control unit 120 may, for example, include a LAN connection and/or a wireless communication unit (e.g., including general purpose input/output pins (GPIOs)) and/or WLAN.

Main control unit 120 may, for example, include one or more USB ports.

Main control unit 120 may include a power supply.

Main control unit 120 may, for example, include a cooling system (e.g., a heat sink metal case and a fan).

Main control unit 120 may be, for example, a host of a multithreaded webserver that may handle service requests from, e.g., remote control unit 140 and perform actions via a selected protocol (e.g., rest protocol, etc.) and/or host processes and codes to perform functions as described hereinbelow.

Main control unit 120 may, for example, include a proxy and/or a peer to peer (P2P) connection to access the main control unit 120 remotely for various services such as, e.g., streaming images being captured by camera 112 remotely or taking actions on remote control device 140.

Remote control unit 140 may be configured to remotely control and/or receive notification from main control unit 120. Remote control unit 140 may be, for example, an application running on a smartphone of a user.

Remote control unit 140 may be configured to, for example, enable and disable a play mode for main control unit 120 to avoid false alarms and notifications in the case if the pool is being used by, e.g., kids playing in the pool or fitness practicing.

Remote control unit 140 may be configured to, for example, enable and disable a privacy mode to blur the images being streamed by camera 112 to remote control unit 140.

Remote control unit 140 may be configured to, for example, enable and disable entrance alarm for main control unit 120 to enable and disable alarms and notifications.

Remote control unit 140 may be configured to, for example, set a virtual safety line indicative of a waterline in the pool. For example, upon installation of camera unit 110 within the pool and initiation of system 100, remote control unit 140 may receive an image of the pool including pool's water fill line, and the user may, for example, manually select, on the received image, two opposite points on the water fill line to set the virtual safety line through the selected points. Remote control unit 140 may determine coordinates of the virtual safety line in the received image and send the coordinates to main control unit 120. The virtual safety line may significantly reduce a rate of false alarms associated with the determination of pre-drowning and drowning events based on the underwater images. For example, due to water reflection effects on the water surface visible in the underwater images, it may be challenging to determine based on the underwater images whether a body part of the detected human body is above or below the actual waterline. It has been found by the inventors that the virtual safety line solves this problem, as appearance of a body part above the virtual safety line in the underwater image provides a robust indication that the respective body part is above the actual waterline. An example of the virtual safety line superimposed on the underwater image is described below with respect to FIG. 3.

Remote control unit 140 may be configured to, for example, automatically switch between a local connection (e.g., via LAN/WLAN) or a remote internet connection to main control unit 140 (e.g., as schematically shown in FIG. 1C). For example, remote control unit 140 may locally connect to main control unit 120 if remote control unit 140 identifies that both remote control unit 140 and main control unit 120 are both connected to the same LAN/WLAN. Otherwise, remote control unit 140 may connect to main control unit 120 via a remote internet connection 90.

Remote control unit 140 may be configured to, for example, show the image streams from multiple camera units 110 in the pool.

Remote control unit 140 may be configured to, for example, register one or more users to show the show the image streams from camera unit(s) 110 in the pool. Remote control unit 140 may be configured to, for example, register one or more users to receive notifications from main control unit 120.

Remote control unit 140 may be configured to, for example, cause main control unit 120 to send image sets that causes main control unit to issue a false pre-drowning or drowning alarm to a remote server for further processing and analysis. For example, upon issuance of a pre-drowning or drowning alarm, the user may identify, using remote control unit 140, that the issued alarm is a false alarm, and cause main control unit 120 to send the respective image sets to the remote server, where these images can be further analyzed and, for example, used for re-training and improvement of an AI model (e.g., described herein below with respect to FIG. 4B).

Remote control unit 140 may be configured to, for example, receive a notification concerning a software update available for main control unit 120 and cause main control unit 120 to install the software update.

Remote control unit 140 may be configured to, for example, cause main control unit 120 to reboot.

Remote control unit 140 may be configured to, for example, remotely select and change the WLAN connection of main control unit 120. This feature may, for example, provide easy installation and initiation of system 100 (e.g., as described below with respect to FIG. 8).

In some embodiments, system 100 may include two or more main control units 120. In some embodiments, system 100 may include two or more alarm units 130. In some embodiments, system 100 may include two or more remote control units 140.

Figure 2:
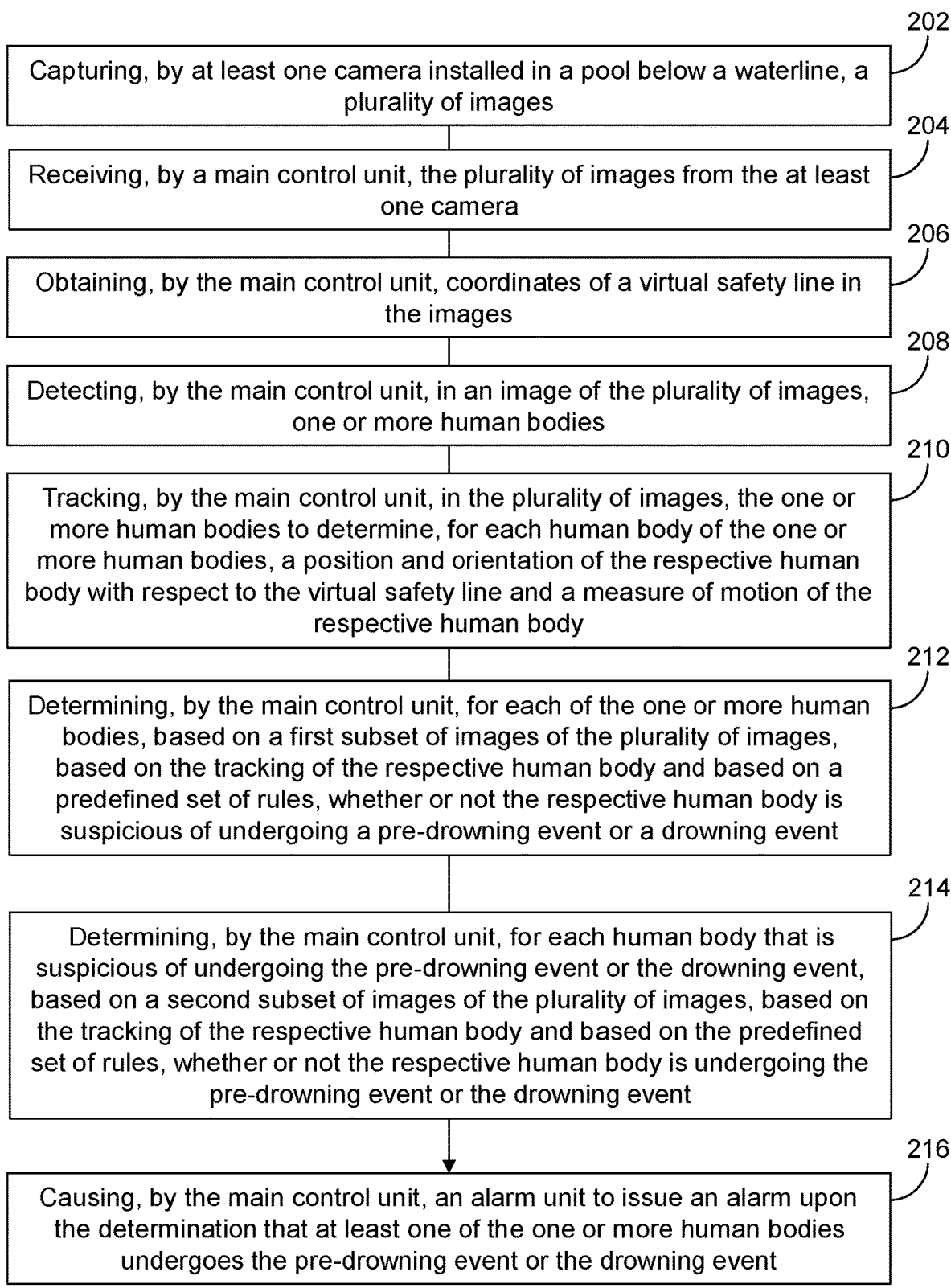
FIG. 2 is a flowchart of a method of pre-drowning and drowning detection based on underwater images, according to some embodiments of the invention.

Reference is now made to FIG. 2, which is a flowchart of a method of pre-drowning and drowning detection based on underwater images, according to some embodiments of the invention.

The method may be implemented by system 100 described above with respect to FIGS. 1A, 1B and 1C, which may be configured to implement the method.

The method may include capturing 202, by at least one camera installed in a pool below a waterline, a plurality of images (e.g., by at least one camera 112 of corresponding at least one camera unit 110 as described above with respect to FIGS. 1A, 1B and 1C).

The method may include receiving 204, by a main control unit, the plurality of images from the at least one camera (e.g., main control unit 120 as described above with respect to FIGS. 1A, 1B and 1C).

Some embodiments may include preprocessing, by the main control unit, at least a portion of images of the plurality of images. For example, if the images being captured by the at least one camera are not clear or blur, the main control unit may, for example, apply, e.g., a histogram equalization on the images to improve the clarity thereof.

The method may include obtaining 206, by the main control unit, coordinates of a virtual safety line in the images, wherein the virtual safety line is indicative of the waterline in the pool. For example, the coordinates of the virtual safety line may be received by the main control unit from a remote control unit (e.g., remote control unit 140 described above with respect to FIGS. 1A, 1B and 1C). For example, the remote control unit may determine the coordinates of the virtual safety line in the images being captured by the at least one camera based on the user's input, e.g., during installation and initiation of the system (e.g., as described above with respect to FIGS. 1A, 1B and 1C). In another example, the main control unit may determine virtual safety line and the coordinates thereof in the images based on at least one image of the plurality of images. An example of the virtual safety line superimposed on the underwater image is described below with respect to FIG. 3.

The method may include detecting 208, by the main control unit, in an image of the plurality of images, one or more human bodies (e.g., as described below with respect to FIGS. 4A, 4B, 4C and 4D).

The method may include tracking 210, by the main control unit, in the plurality of images, the one or more human bodies to determine, for each human body of the one or more human bodies, a position and orientation of the respective human body with respect to the virtual safety line and a measure of motion of the respective human body (e.g., as described below with respect FIGS. 5A, 5B and FIGS. 6A, 6B).

The method may include determining 212, by the main control unit, for each of the one or more human bodies, based on a first subset of images of the plurality of images, based on the tracking of the respective human body and based on a predefined set of rules, whether or not the respective human body is suspicious of undergoing a pre-drowning event or a drowning event. Some examples of human bodies that are suspicious of undergoing the pre-drowning event or the drowning event according to some embodiments of the invention are described below with respect to FIGS. 7A, 7B and 7C.

The method may include determining 214, by the main control unit, for each human body that is suspicious of undergoing the pre-drowning event or the drowning event, based on a second subset of images of the plurality of images, based on the tracking of the respective human body and based on the predefined set of rules, whether or not the respective human body is undergoing the pre-drowning event or the drowning event (e.g., as described below with respect to FIGS. 7A, 7B and 7C. The second subset of subsequent images may, for example, correspond to a predefined time interval for which a tracking of a human body that is suspicious of undergoing the pre-drowning event or the drowning event is required (for example, 5-15 seconds, e.g., 10 seconds).

The method may include causing 216, by the main control unit, an alarm unit to issue an alarm upon the determination that at least one of the one or more human bodies undergoes the pre-drowning event or the drowning event.

Some embodiments may include sending, by the main control unit, upon the determination that at least one of the one or more human bodies undergoes the pre-drowning event or the drowning event, a respective notification to a remote control unit (e.g., remote control unit 140 described above with respect to FIGS. 1A, 1B and 1C).

Some embodiments may include counting, by the main control unit, the one or more detected human bodies to provide a number of human bodies in the images. Some embodiments may include updating, by the main control unit, based on the tracking, the number of human bodies being detected in the images. Some embodiments may include causing, by the main control unit, the alarm unit to issue an alert indicative of entrance of a human body to the pool (e.g., if the entrance alert feature is enabled).

Figure 3:
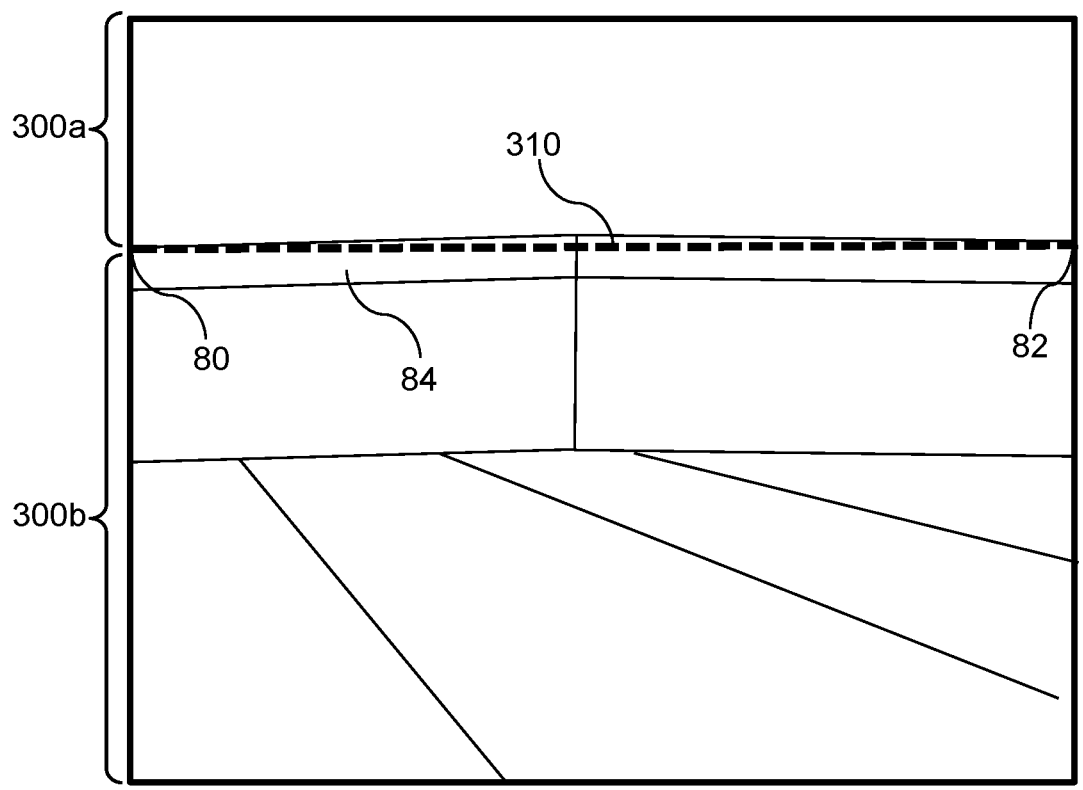
FIG. 3 is a schematic illustration of an underwater image and of a virtual safety line superimposed on the image, according to some embodiments of the invention.

Reference is now made to FIG. 3, which is a schematic illustration of an underwater image 300 and of a virtual safety line 310 superimposed on the image, according to some embodiments of the invention.

FIG. 3 schematically depicts an underwater image 300 of the pool captured by a camera of a system 100 pre-drowning and drowning detection (e.g., camera 112 of camera unit 110 of system 100 described above with respect to FIGS. 1A, 1B and 1C). FIG. 3 further schematically depicts a virtual safety line 310 extending through two horizontally opposite points 80, 82 on a water fill line marking 84 of the pool. Points 80, 82 may be, for example, manually selected by, e.g., the user using a remote control unit, and the remote control unit may determine the coordinates of virtual safety line 310 in the image and send the coordinates to a main control unit of the system (e.g., as described above with respect to FIGS. 1A, 1B and 1C).

Virtual safety line 310 may significantly reduce a rate of false alarms associated with the determination of pre-drowning and drowning events based on the underwater images. For example, due to water reflection effects, it may be challenging to determine based on the underwater images whether a body part of the detected human body is above or below the actual waterline in the pool. It has been found by the inventors that virtual safety line 310 solves this problem, as appearance of a body part above virtual safety line 310 in underwater image 300 (e.g., region 300a schematically shown in FIG. 3) provides a robust indication that the respective body part is above the actual waterline, and appearance of a body part below virtual safety line 310 in underwater image 300 (e.g., region 300b schematically shown in FIG. 3) provides a robust indication that the respective body part is below the actual waterline.

Figure 4A:
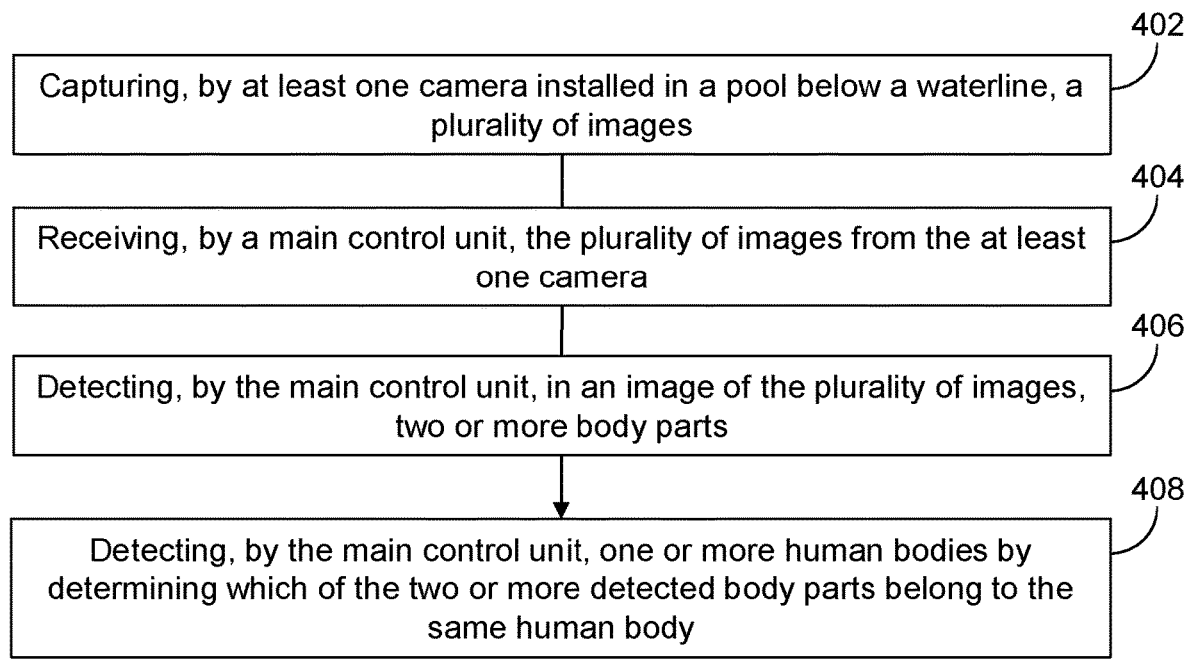
FIG. 4A is a flowchart of a method of detecting one or more human bodies in underwater images, according to some embodiments of the invention.

Reference is now made to FIG. 4A, which is a flowchart of a method of detecting one or more human bodies in underwater images, according to some embodiments of the invention.

Figure 4B:
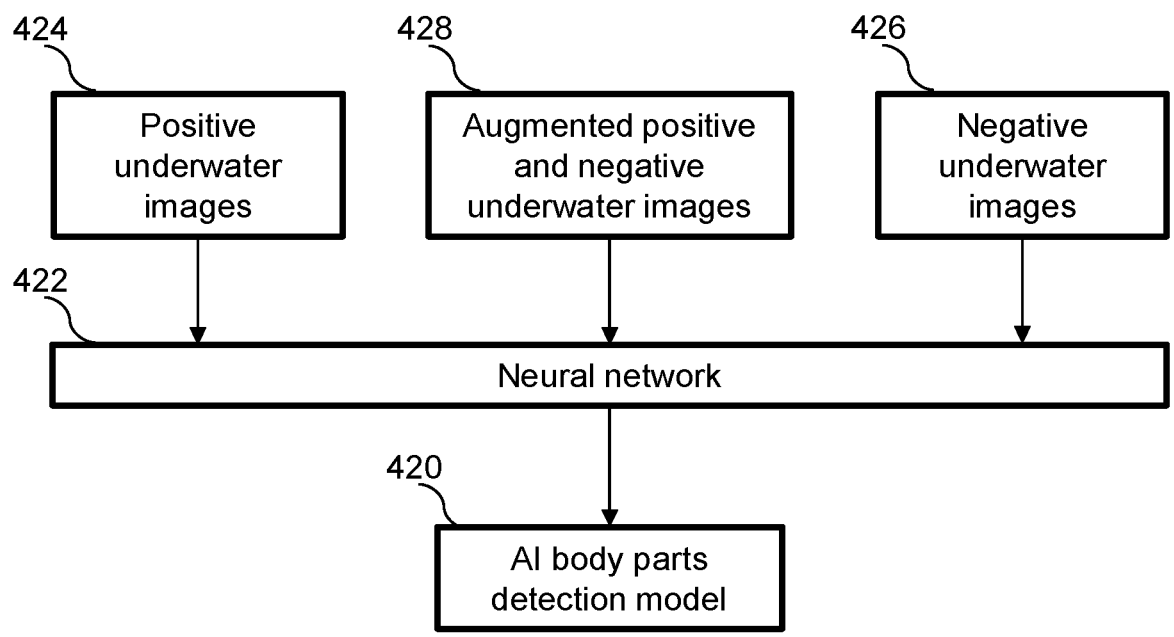
FIG. 4B is a flowchart of a training process of an artificial intelligence (AI) model for body parts detection in underwater images, according to some embodiments of the invention.

Reference is also made to FIG. 4B, which is a flowchart of a training process of an artificial intelligence (AI) model 420 for body parts detection in underwater images, according to some embodiments of the invention.

The method may be implemented by system 100 described above with respect to FIGS. 1A, 1B and 1C, which may be configured to implement the method.

The method may include capturing 402, by at least one camera installed in a pool below a waterline, a plurality of images (e.g., by at least one camera 112 of corresponding at least one camera unit 110 as described above with respect to FIGS. 1A, 1B and 1C).

The method may include receiving 404, by a main control unit, the plurality of images from the at least one camera (e.g., main control unit 120 as described above with respect to FIGS. 1A, 1B and 1C).

The method may include detecting 406, by the main control unit, in an image of the plurality of images, two or more body parts.

Some embodiments may include detecting the two or more body parts in the image using a pre-trained artificial intelligence (AI) body parts detection model. For example, the AI body parts detection model 420 may, for example, include a neural network 422, as schematically shown in FIG. 4B. Neural network 422 may be trained using, for example: (i) a first set 424 of positive underwater images containing body parts of human bodies, preferably at different possible positions and orientations; (ii) a second set 426 of negative underwater images containing no body parts; and (iii) a third set 428 of augmented positive and augmented negative underwater images (e.g., as schematically shown in FIG. 4B). For example, AI body parts detection model 420 may be trained to detect a head, an upper body part and/or portions thereof (e.g., arms, palm, chest, upper back, neck, waist, etc.), a lower body part and/or portions thereof (e.g., legs, feet, etc.) and/or a full body.

The method may include detecting 408, by the main control unit, one or more human bodies by determining which of the two or more detected body parts, belong to the same human body (e.g., as described below with respect to FIG. 4C).

Figure 4C:
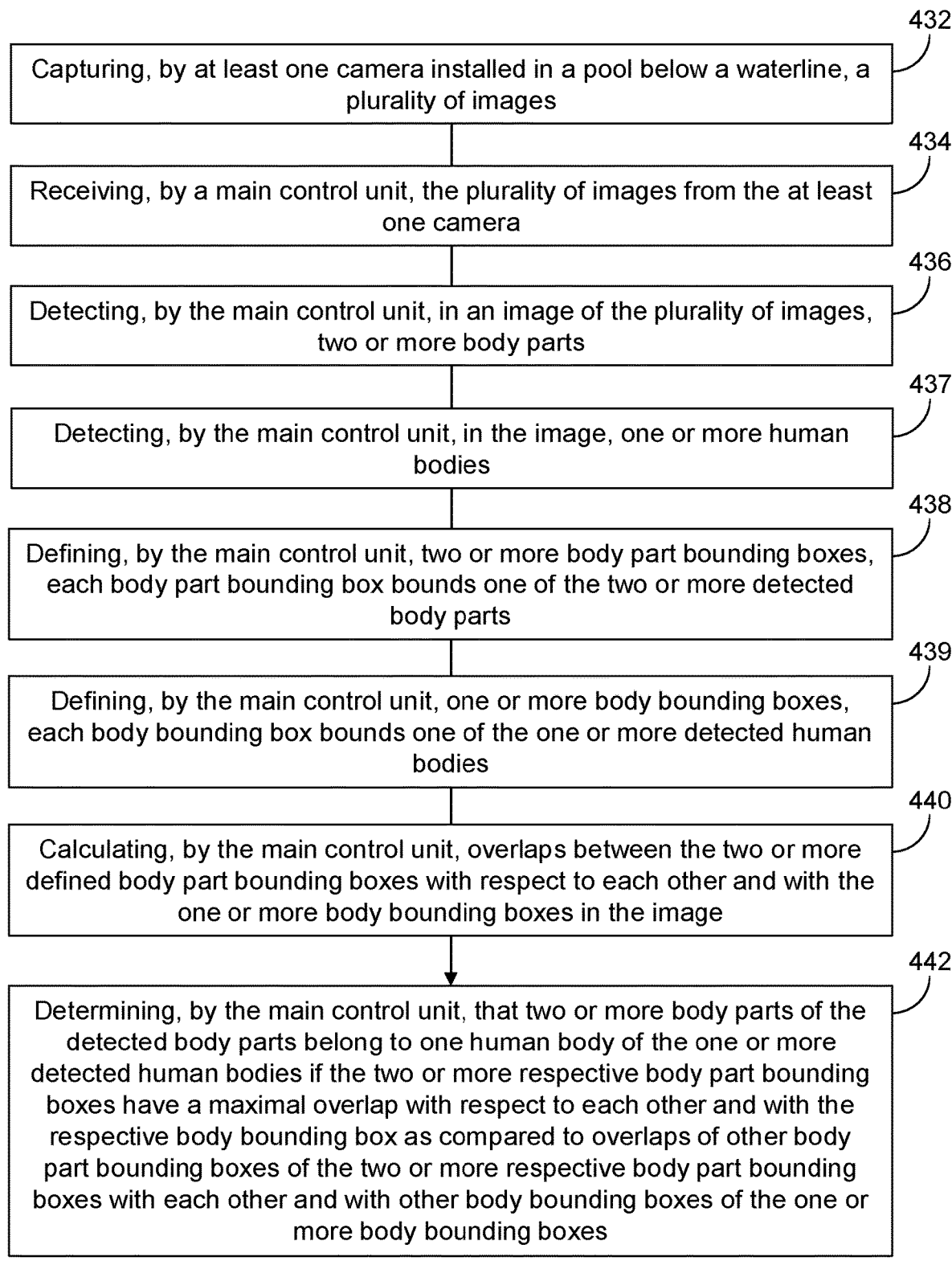
FIG. 4C is a flowchart of a method of linking two or more body parts detected in an image to a human body, according to some embodiments of the invention.

Reference is now made to FIG. 4C, which is a flowchart of a method of linking two or more body parts detected in an image to a human body, according to some embodiments of the invention.

The method may be implemented by system 100 described above with respect to FIGS. 1A, 1B and 1C, which may be configured to implement the method.

The method may include capturing 432, by at least one camera installed in a pool below a waterline, a plurality of images (e.g., as described above with respect to FIG. 4A).

The method may include receiving 434, by a main control unit, the plurality of images from the at least one camera (e.g., as described above with respect to FIG. 4A).

The method may include detecting 436, by the main control unit, in an image of the plurality of images, two or more body parts (e.g., as described above with respect to FIG. 4A).

The method may include detecting 437, by the main control unit, in the image, one or more human bodies (e.g., as described above with respect to FIG. 4A).

The method may include defining 438, by the main control unit, two or more body part bounding boxes, each body part bounding box bounds one of the two or more detected body parts.

The method may include defining 439, by the main control unit, one or more body bounding boxes, each body bounding box bounds one of the one or more detected human bodies.

The method may include calculating 440, by the main control unit, overlaps between the two or more defined body part bounding boxes with respect to each other and with the one or more body bounding boxes in the image.

The method may include determining 442, by the main control unit, that two or more body parts of the detected body parts belong to one human body of the one or more detected human bodies if the two or more respective body part bounding boxes have a maximal overlap with respect to each other and with the respective body bounding box as compared to overlaps of other body part bounding boxes of the two or more respective body part bounding boxes with each other and with other body bounding boxes of the one or more body bounding boxes. Step 442 may be done using, for example, intersection over union (IoU) method (e.g., as schematically shown in FIG. 4D).

Figure 4D:
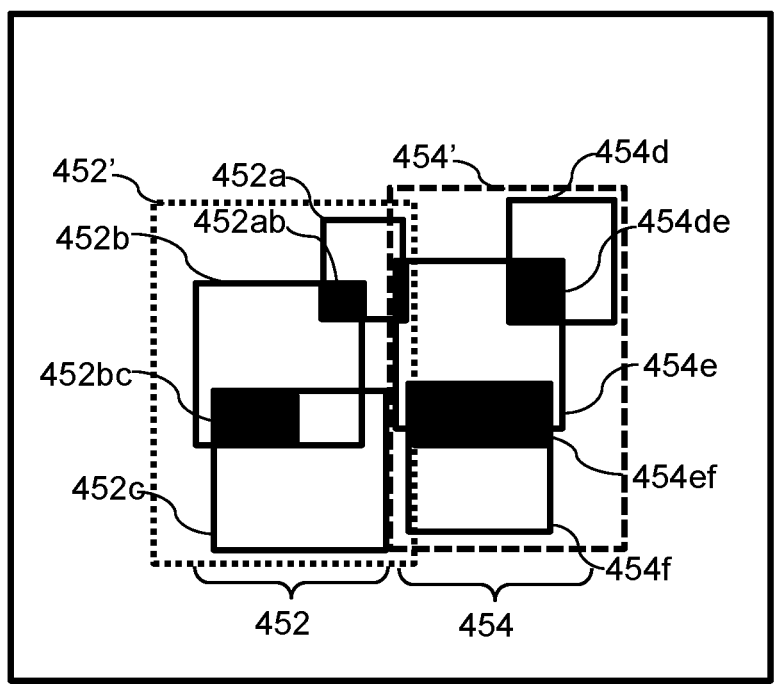
FIG. 4D is a schematic illustration of an underwater image illustrating a process of detection of one or more human bodies, according to some embodiments of the invention.

Reference is now made to FIG. 4D, which is a schematic illustration of an underwater image 450 illustrating a process of detecting of one or more human bodies, according to some embodiments of the invention.

FIG. 4D schematically shows an underwater image 450 containing a first detected human body 452 and a second detected human body 454.

First human body 452 represented by a first body bounding box 452' has been detected and linked to first detected body part represented by a first body part bounding box 452a (e.g., a head), a second detected body part represented by a second body part bounding box 452b (e.g., an upper body part) and a third body part represented by a third body part bounding box 452c based on maximal overlaps 452ab and 452bc and maximum overlaps of body part bounding boxes 452a-452c to body bounding box 452'.

Second human body 454 represented by a second body bounding box 454' has been detected and linked to first detected body part represented by a fourth body part bounding box 454d (e.g., a head), a fifth detected body part represented by a second body part bounding box 454e (e.g., an upper body part) and a sixth body part represented by a third body part bounding box 454f based on maximal overlaps 454de and 454ed there between and maximum overlaps of body part bounding boxes 454a-454c to body bonding box 454'.

Figure 5A:
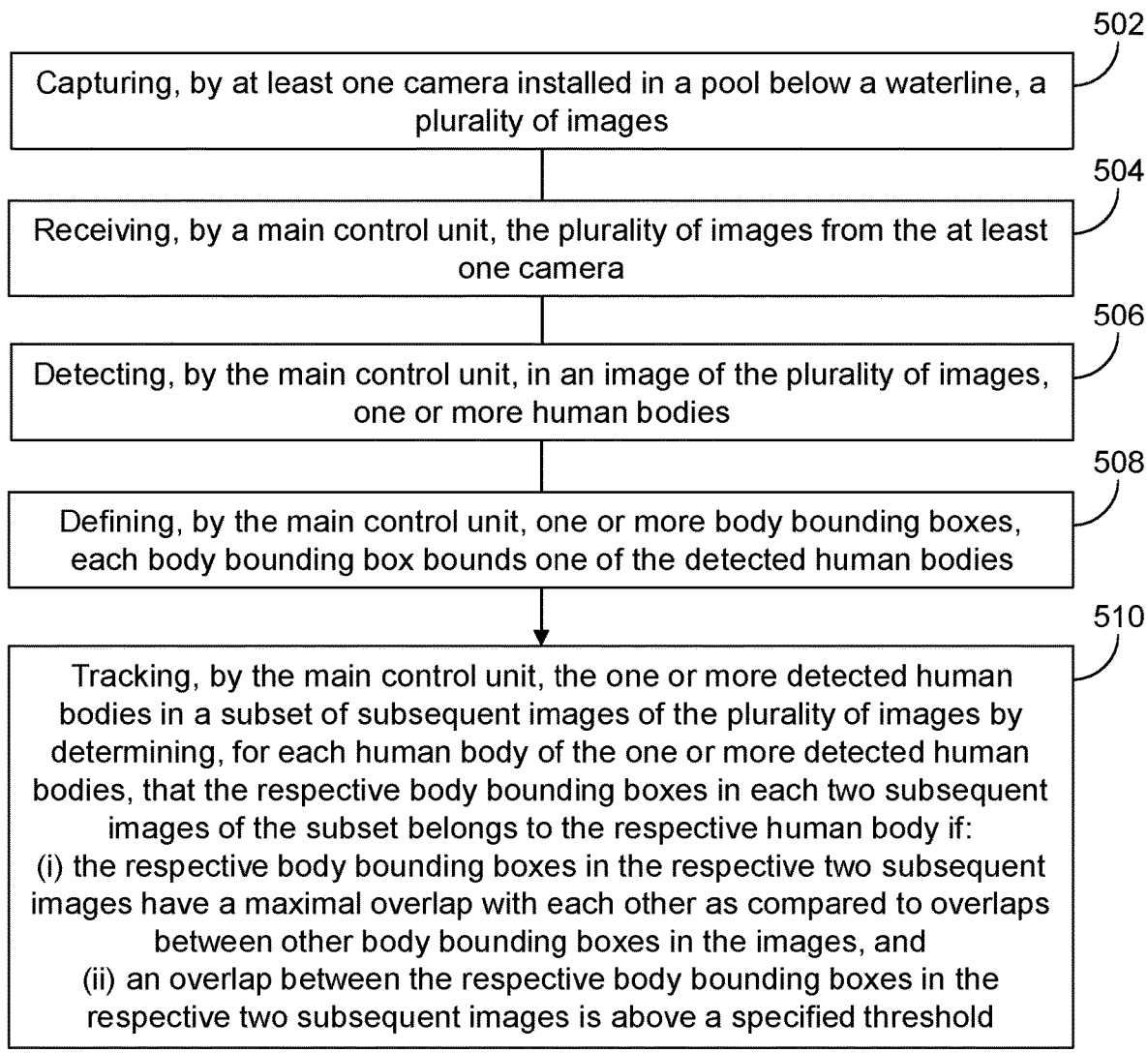
FIG. 5A is a flowchart of a method of tracking of one or more human bodies in a subset of subsequent underwater images, according to some embodiments of the invention.

Reference is now made to FIG. 5A, which is a flowchart of a method of tracking of one or more human bodies in a subset of subsequent underwater images, according to some embodiments of the invention.

The method may be implemented by system 100 described above with respect to FIGS. 1A, 1B and 1C, which may be configured to implement the method.

The method may include capturing 502, by at least one camera installed in a pool below a waterline, a plurality of images (e.g., by at least one camera 112 of corresponding at least one camera unit 110 as described above with respect to FIGS. 1A, 1B and 1C).

The method may include receiving 504, by a main control unit, the plurality of images from the at least one camera (e.g., main control unit 120 as described above with respect to FIGS. 1A, 1B and 1C).

The method may include detecting 506, by the main control unit, in an image of the plurality of images, one or more human bodies.

The method may include defining 508, by the main control unit, one or more body bounding boxes, each body bounding box bounds one of the one or more detected human bodies.

Figure 5B:
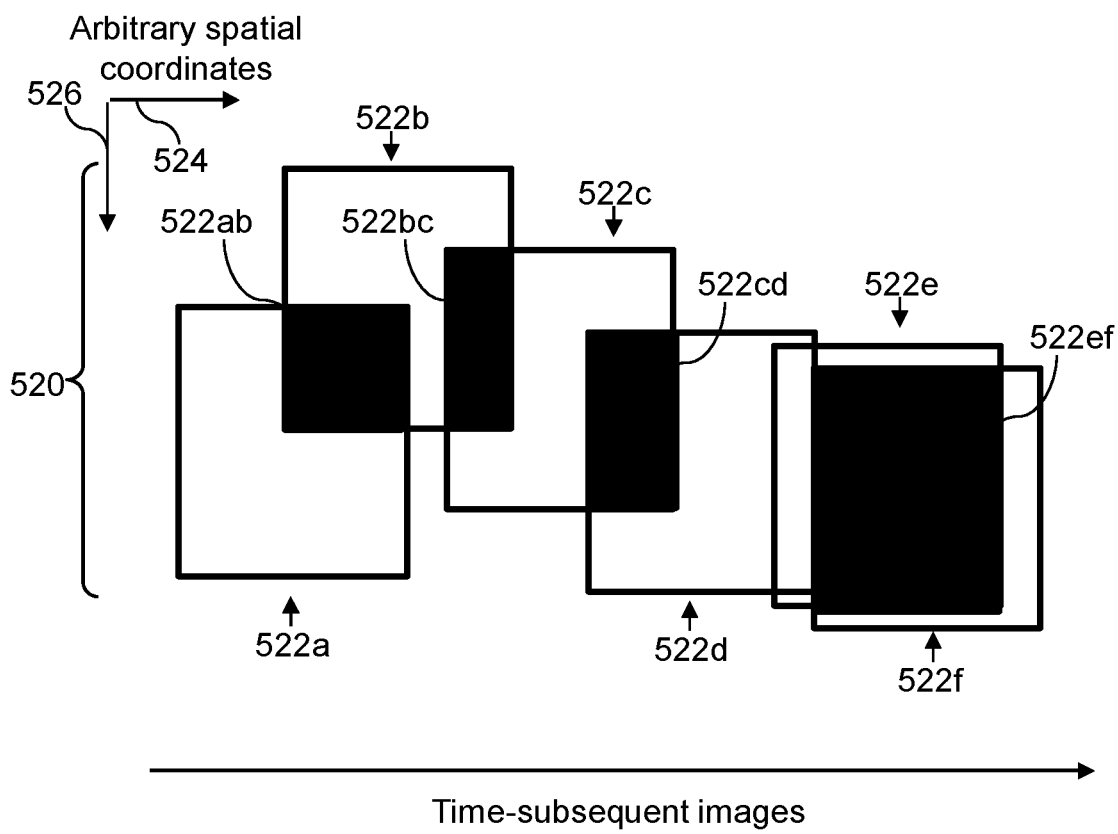
FIG. 5B schematically shows a process of tracking the same detected human in subsequent underwater images, according to some embodiments of the invention.

The method may include tracking 510, by the main control unit, the one or more detected human bodies in a subset of subsequent images of the plurality of images by determining, for each human body of the one or more detected human bodies, that the respective body bounding box in each two subsequent images of the subset belongs to the respective human body if: (i) the respective body bounding boxes in the respective two subsequent images have a maximal overlap with each other as compared to overlaps between other body bounding boxes in the images and (ii) an overlap between the respective body bounding boxes in the respective two subsequent images is above a specified threshold (e.g., as schematically shown in FIG. 5B). Step 510 may be done using, for example, intersection over union (IoU) method (e.g., as schematically shown in FIG. 5B). Setting the minimal specified threshold (e.g., 5-10%) may ensure that fast moving human bodies exhibiting normal swimming will not be tracked, and thus save computational resources and reduce a risk of false alarms.

Some embodiments may include determining, by the main control unit, for each human body of the one or more detected human bodies, based on the tracking of the respective human body, a measure of motion of the respective human body. The measure of motion may be indicative of, for example, how fast the respective human body moves. For example, if overlaps between positions of the respective body bounding box in the subsequent images of the subset are increasing, this may mean that the respective human body is slowing down. In another example, if overlaps between positions of the respective body bounding box in the subsequent images of the subset are decreasing, this may mean that the respective human body is speeding up. Some embodiments may include determining, by the main control unit, for each human body of the one or more detected human bodies, based on the tracking of the respective human body, a measure of motion of the respective human body in a vertical direction and a measure of motion in a horizontal direction.

Reference is now made to FIG. 5B, which schematically shows a process of tracking the same detected human in subsequent underwater images, according to some embodiments of the invention.

FIG. 5B schematically shows a process of tracking the same detected human body represented by a body bounding box 520 in subsequent images 522a, 522b, 522c, 522d, 522e, 522f based on overlaps 522ab, 522bc, 522cd, 522ef between positions of the body bounding box 520 in the subsequent images 522a, 522b, 522c, 522d, 522e, 522f. Based on the tracking, the measure of motion of the respective human body (represented by body bounding box 520) in at least one of a horizontal direction 524 and a vertical direction 526 may be determined.

Figure 6A:
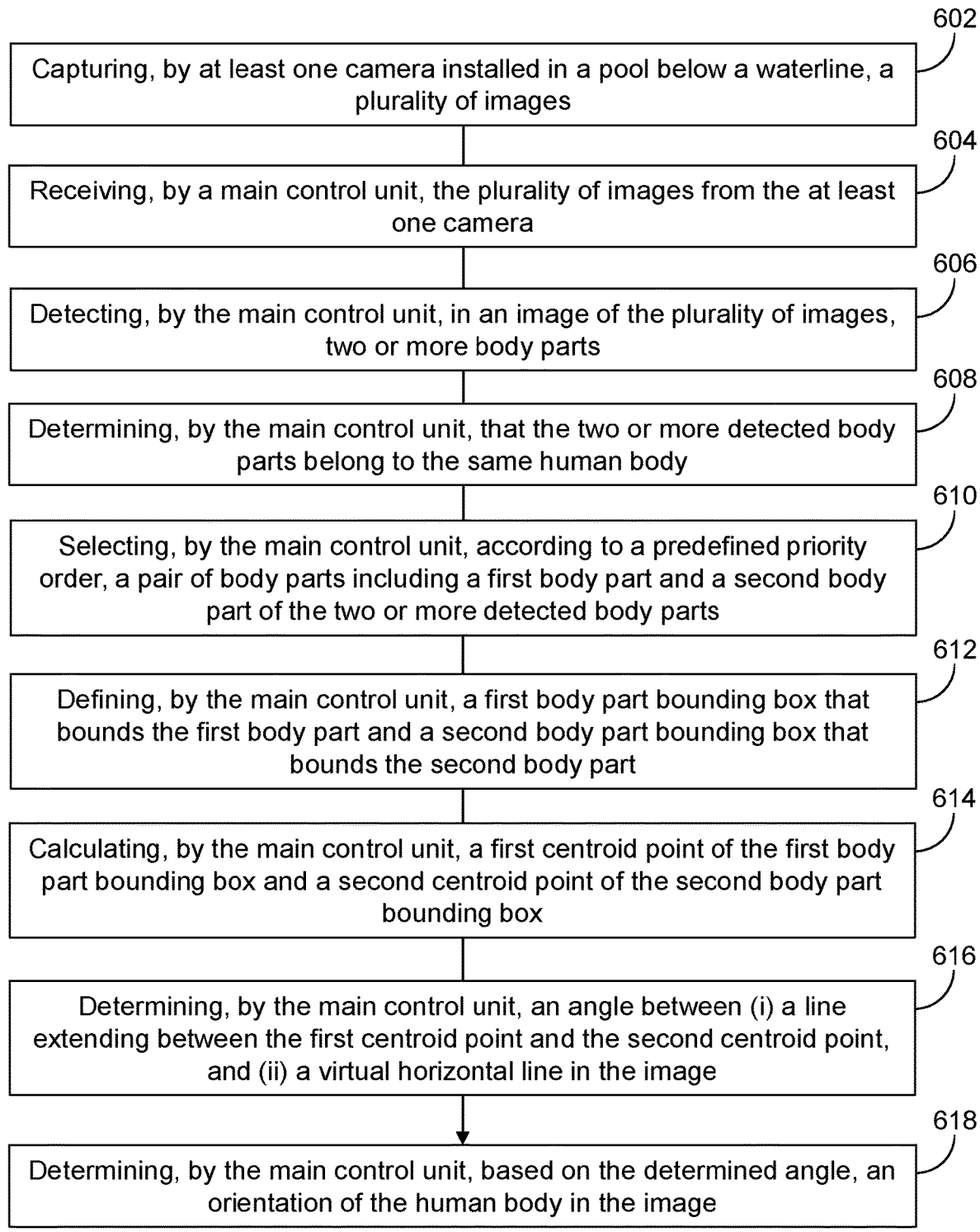
FIG. 6A is a flowchart of a method of determining an orientation of a human body in underwater images, according to some embodiments of the invention.

Reference is now made to FIG. 6A, which is a flowchart of a method of determining an orientation of a human body in underwater images, according to some embodiments of the invention.

The method may be implemented by system 100 described above with respect to FIGS. 1A, 1B and 1C, which may be configured to implement the method.

The method may include capturing 602, by at least one camera installed in a pool below a waterline, a plurality of images (e.g., by at least one camera 112 of corresponding at least one camera unit 110 as described above with respect to FIGS. 1A, 1B and 1C).

The method may include receiving 604, by a main control unit, the plurality of images from the at least one camera (e.g., main control unit 120 as described above with respect to FIGS. 1A, 1B and 1C).

The method may include detecting 606, by the main control unit, in an image of the plurality of images, two or more body parts.

The method may include determining 608, by the main control unit, that the two or more detected body parts belong to the same human body (e.g., as described above with respect to FIGS. 4A and 4C).

The method may include selecting 610, by the main control unit, according to a predefined body parts priority list, a pair of body parts including a first body part and a second body part of the two or more detected body parts.

The method may include defining 612, by the main control unit, a first body part bounding box that bounds the first body part and a second body part bounding box that bounds the second body part in the image.

The method may include calculating 614, by the main control unit, a first centroid point of the first body part bounding box and a second centroid point of the second body part bounding box in the image.

The method may include determining 616, by the main control unit, an angle between (i) a line extending between the first centroid point and the second centroid point, and (ii) a virtual horizontal line in the image.

The method may include determining 618, by the main control unit, based on the determined angle, an orientation of the human body in the image. For example, if the determined angle is close to 90° the orientation of the human body is vertical, and of the determined angle is close to 0° the orientation of the human body is horizontal.

The predefined body parts priority list (e.g., recited in step 610 above) may, for example, include a head, an upper body part and a lower body part, wherein the head has the highest priority, and the lower body part has the lowest priority. This may mean that if the head and the upper body part are detectable in the image, the orientation of the human body should be determined as described in steps 602-618 above with respect to the head and the upper body part, etc.

Figure 6B:
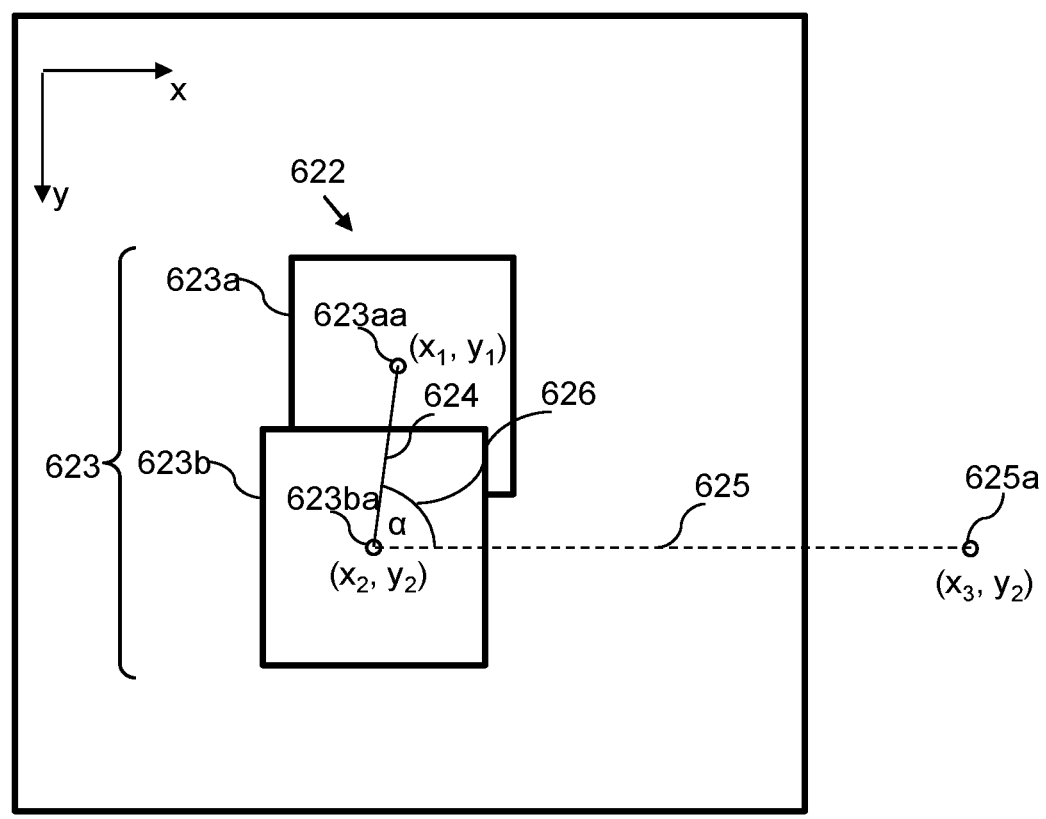
FIG. 6B is a schematic illustration of a process of determination of an orientation of a human body in underwater images, according to some embodiments of the invention.

Reference is now made to FIG. 6B, which is a schematic illustration of a process of determination of an orientation of a human body in underwater images, according to some embodiments of the invention.

FIG. 6B schematically shows an underwater image 620 including a detected human body 622. The detected human body 622 includes two detected body parts providing a selected pair 623 of body parts—a first body part (e.g., an upper body part) represented by a first body part bounding box 623a and having a first centroid point 623aa, and a second body part (e.g., a lower body part) represented by a second body part bounding box 623b having a second centroid point 623ba. FIG. 6B schematically shows a line 624 extending between first centroid point 623aa and second centroid point 623ba, and a virtual horizontal line 625. FIG. 6B further schematically shows an angle 626, α, calculated by between line 624 and virtual horizontal line 625. Considering that first centroid point 623aa has coordinates $(x_1, y_1)$, second centroid 623ba point has coordinates $(x_2, y_2)$, and virtual horizontal line 625 extends between second centroid 623ba and a virtual far observation point 625a having coordinates $(x_3, y_2)$, e.g., in an arbitrary Euclidean coordinate system x-y, angle 626, α, may be provided by:

$$\alpha = \arctan\left(\frac{y_2 - y_2}{x_3 - x_1}\right) - \arctan\left(\frac{y_1 - y_2}{x_1 - x_2}\right)$$

If angle 626 is close to 90° the orientation of the human body is vertical, and of angle 626 is close to 0° the orientation of the human body is horizontal.

Figure 7A:
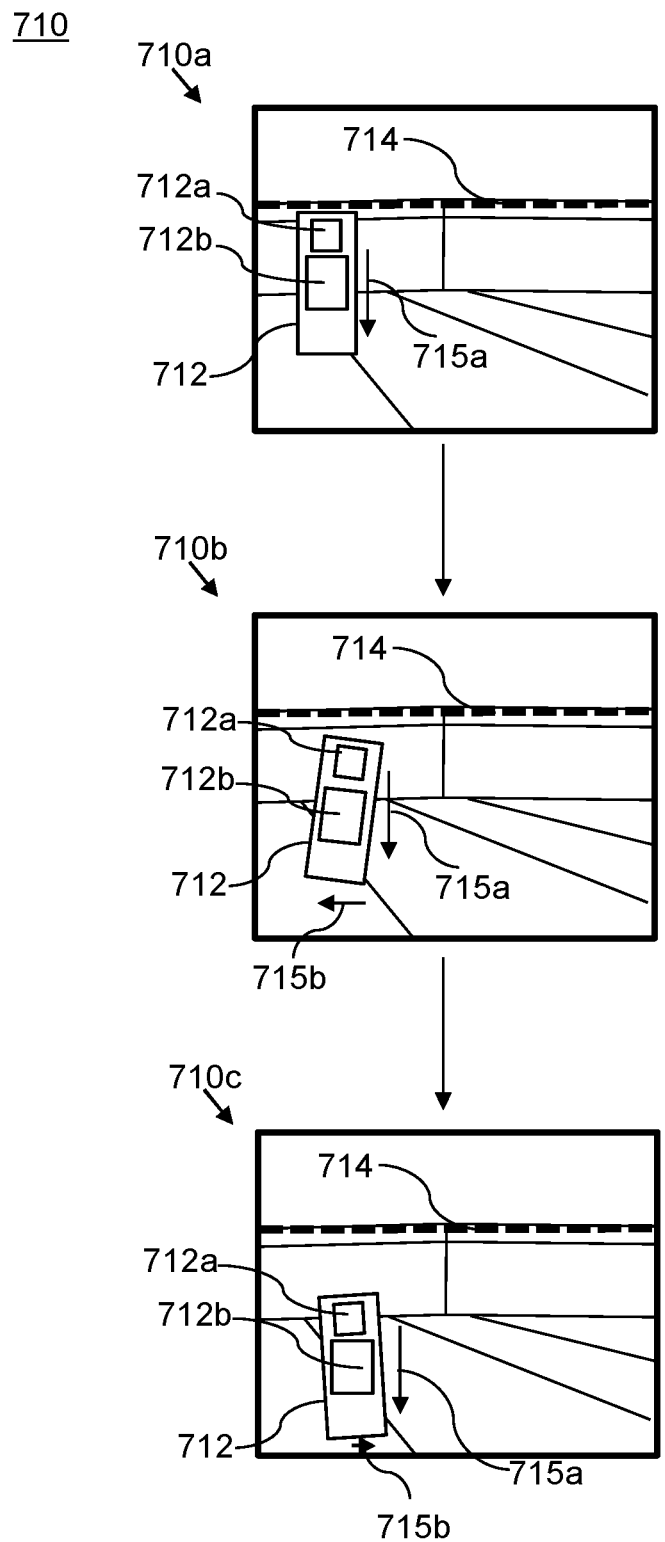
FIG. 7A schematically shows a subset of subsequent underwater images including a human body that is suspicious of undergoing a pre-drowning event, according to some embodiments of the invention.

Reference is now made to FIG. 7A, which schematically shows a subset 710 of subsequent underwater images including a human body that is suspicious of undergoing a pre-drowning event, according to some embodiments of the invention.

FIG. 7A schematically shows a subset 710 of subsequent underwater images 710a, 710b, 710c including a detected human body represented by a body bounding box 712. The human body includes two detected body parts—e.g., a head represented by a head bounding box 712a and an upper body part represented by an upper body part bounding box 712b. FIG. 7A schematically shows a virtual safety line 714 indicative of a waterline in the pool (e.g., like virtual safety line 310 described above with respect to FIG. 3).

The human body may be suspicious of undergoing the pre-drowning event according to some embodiments of the invention if: (i) the head (represented in FIG. 7A by head bounding box 712a) of the human body in images 710 is below virtual safety line 714, (ii) an orientation of the human body (represented in FIG. 7A by body bounding box 712) in images 710 is vertical (or substantially vertical), (iii) a measure of motion of the human body in a vertical direction (represented in FIG. 7A by an arrow 715a) in images 710 is greater than a measure of motion of the human body in a horizontal direction (represented in FIG. 7A by an arrow 715b) in images 710, and (iv) a total measure of motion of the human body in images 710 is below a predefined motion threshold.

Upon determination that the human body is suspicious of undergoing the pre-drowning event, the respective human body may be further tracked, by the main control unit, in an additional subset of subsequent images corresponding to a predefined time interval (for example, 5-15 seconds, e.g., 10 seconds). Unless during the predefined time interval at least one of conditions (i)-(iv) described above with respect to FIG. 7A is unmet, the main control unit may determine that the human body is actually undergoing the pre-drowning event and may cause the alarm unit to issue an alarm.

Figure 7B:
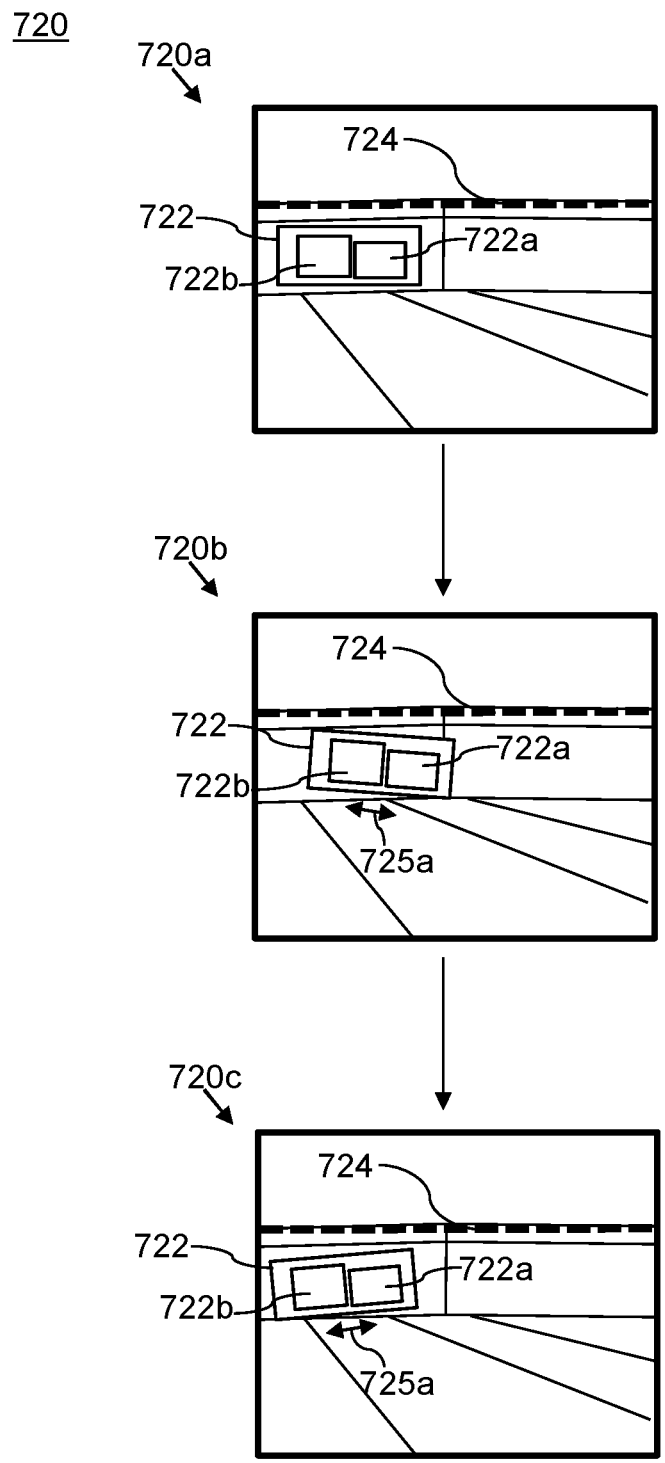
FIG. 7B schematically shows a subset of subsequent underwater images including a human body that is suspicious of undergoing a drowning event, according to some embodiments of the invention.

Reference is now made to FIG. 7B, which schematically shows a subset 720 of subsequent underwater images including a human body that is suspicious of undergoing a drowning event, according to some embodiments of the invention.

FIG. 7B schematically shows a subset 720 of subsequent underwater images 720a, 720b, 720c including a detected human body represented by a body bounding box 722. The human body includes two detected body parts—e.g., an upper body part represented by an upper body part bounding box 722a and a lower body part represented by a lower body part bounding box 722b. FIG. 7B schematically shows a virtual safety line 724 indicative of a waterline in the pool (e.g., like virtual safety line 310 described above with respect to FIG. 3).

The human body may be suspicious of undergoing the drowning event according to some embodiments of the invention if: (i) the orientation of the human body (represented in FIG. 7B by bounding box 722) in images 710 is horizontal (or substantially horizontal); (ii) the human body (represented in FIG. 7B by bounding box 722) in images 710 is below virtual safety line 724; and (iii) a total measure of motion of the human body (represented in FIG. 7A by an arrow 725a) in images 720 is below a predefined motion threshold.

Upon determination that the human body is suspicious of undergoing the drowning event, the respective human body may be further tracked, by the main control unit, in an additional subset of subsequent images corresponding to a predefined time interval (for example, 5-15 seconds, e.g., 10 seconds). Unless during the predefined time interval at least one of conditions (i)-(iii) described above with respect to FIG. 7B is unmet, the main control unit may determine that the human body is actually undergoing the drowning event and may cause the alarm unit to issue an alarm.

Figure 7C:
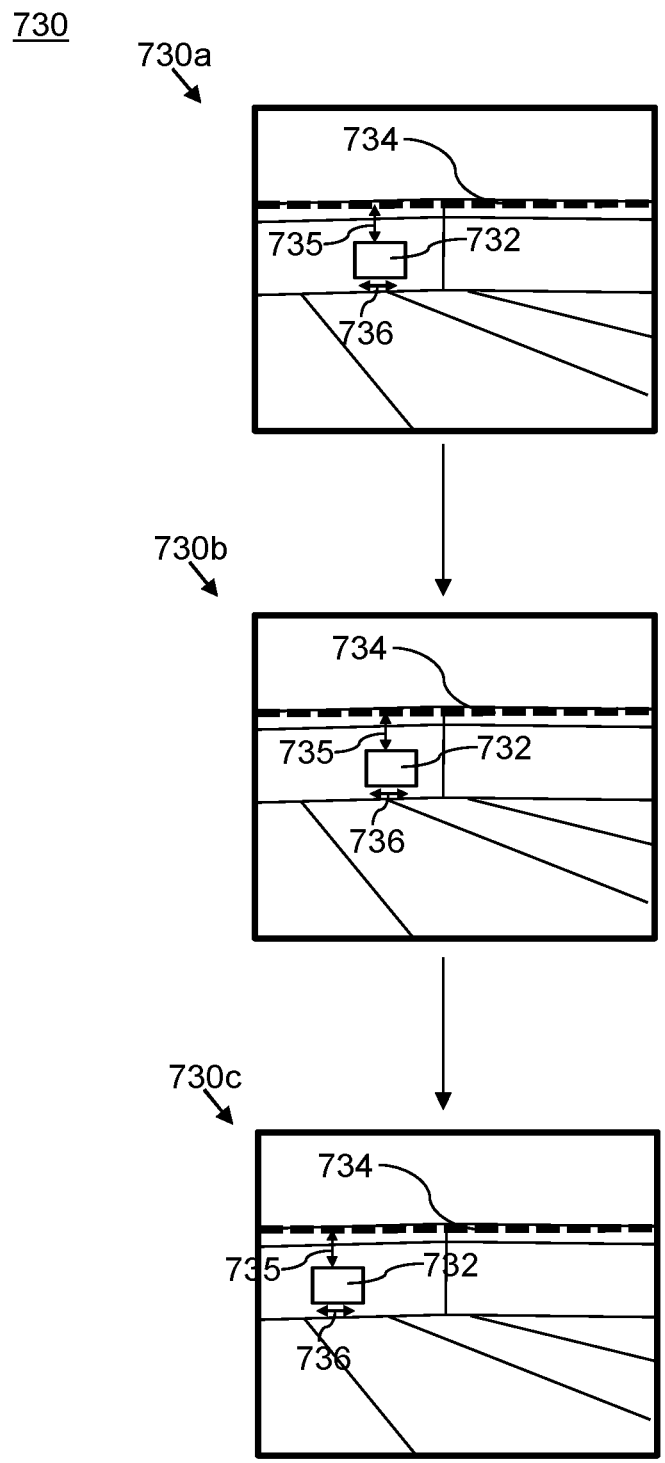
FIG. 7C schematically shows a subset of subsequent underwater images including a small or far human body that is suspicious of undergoing a drowning event, according to some embodiments of the invention.

Reference is now made to FIG. 7C, which schematically shows a subset 730 of subsequent underwater images including a small or far human body that is suspicious of undergoing a drowning event, according to some embodiments of the invention.

FIG. 7C schematically shows a subset 730 of subsequent underwater images 730a, 730b, 730c. In images 730a, 730b, 730c, only one body part (represented in FIG. 7A by bounding box 732) of the human body is detectable. In this case, the human body may be considered as a small object (e.g., a child) or a far object (e.g., with respect to the camera unit). FIG. 7C schematically shows a virtual safety line 734 indicative of a waterline in the pool (e.g., like virtual safety line 310 described above with respect to FIG. 3).

The human body may be suspicious of undergoing the drowning event according to some embodiments of the invention if: (i) a vertical distance 735 between body part 732 and virtual safety line 734 is above a predefined distance threshold; and (ii) a total measure of motion of body part 732 (represented in FIG. 7A by an arrow 736) in images 730 is below a predefined motion threshold.

Upon determination that the human body is suspicious of undergoing the drowning event, the respective human body may be further tracked, by the main control unit, in an additional subset of subsequent images corresponding to a predefined time interval (for example, 5-15 seconds, e.g., 10 seconds). Unless during the predefined time interval at least one of conditions (i)-(ii) described above with respect to FIG. 7C is unmet, the main control unit may determine that the human body is actually undergoing the pre-drowning event and may cause the alarm unit to issue an alarm.

Figure 7D:
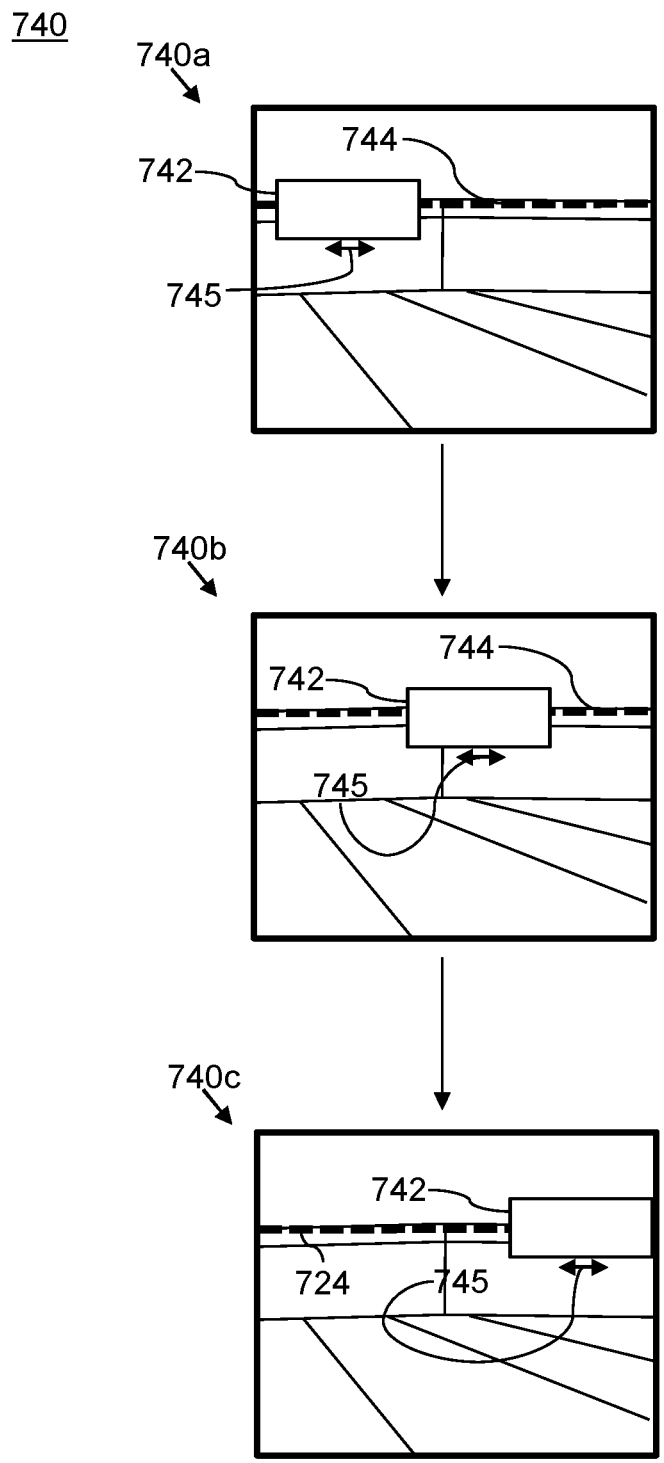
FIG. 7D schematically shows a subset of subsequent underwater images including a human body exhibiting safe and normal swimming, according to some embodiments of the invention.

Reference is now made to FIG. 7D, which schematically shows a subset 740 of subsequent underwater images including a human body exhibiting safe and normal swimming, according to some embodiments of the invention.

FIG. 7D schematically shows a subset 740 of subsequent underwater images 740a, 740b, 740c including a detected human body represented by a body bounding box 742. FIG. 7D schematically shows a virtual safety line 744 indicative of a waterline in the pool (e.g., like virtual safety line 310 described above with respect to FIG. 3).

The human body may be considered as exhibiting safe and normal swimming if, for example: (i) at least a portion of the human body (represented in FIG. 7D by a body bounding box 742) in images 740 is above virtual safety line 744; and (ii) a total measure of motion of the human body (represented in FIG. 7D by an arrow 745) in images 740 is above a predefined motion threshold.

Figure 7E:
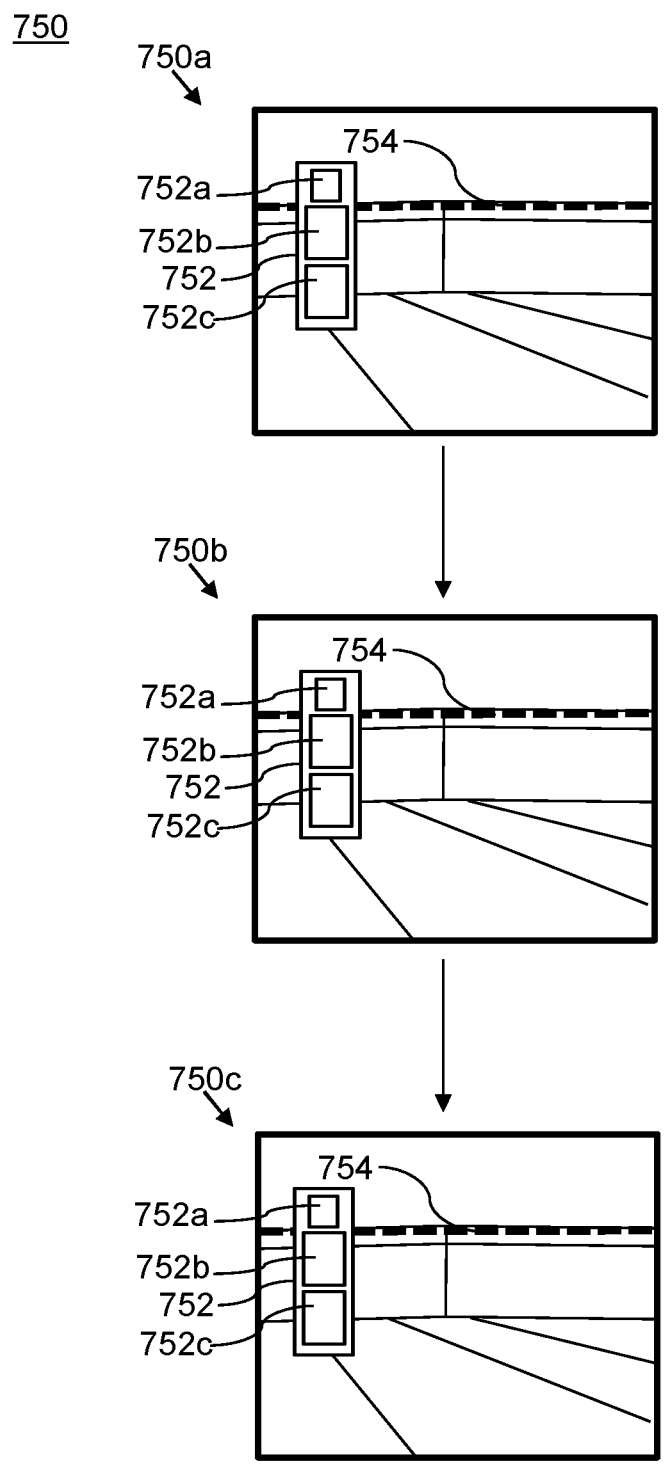
FIG. 7E schematically shows a subset of subsequent underwater images including a human body exhibiting safe and normal standing, according to some embodiments of the invention.

Reference is now made to FIG. 7E, which schematically shows a subset 750 of subsequent underwater images including a human body exhibiting safe and normal standing, according to some embodiments of the invention.

FIG. 7E schematically shows a subset 750 of subsequent underwater images 750a, 750b, 750c including a detected human body represented by a body bounding box 752. The human body includes three detected body parts—e.g., a head represented by a head bounding box 752a, an upper body part represented by an upper body part bounding box 752b and a lower body part represented by a lower body part bounding box 752c. FIG. 7E schematically shows a virtual safety line 754 indicative of a waterline in the pool (e.g., like virtual safety line 310 described above with respect to FIG. 3).

The human body may be considered as exhibiting safe and normal standing if, for example, the head (represented in FIG. 7E by head bounding box 752a) is above virtual safety line 754.

Figure 8:
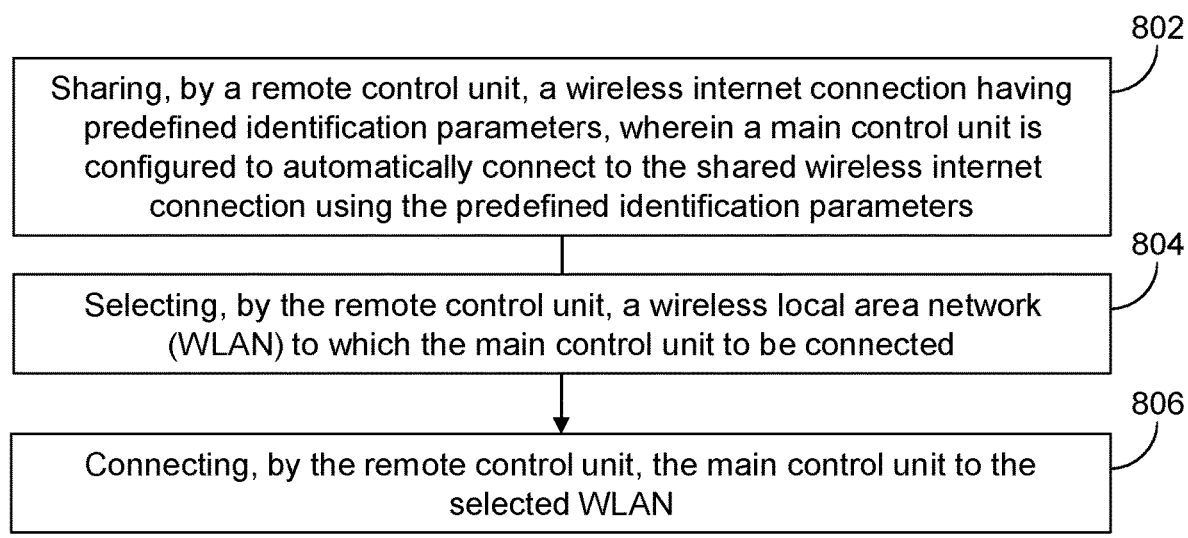
FIG. 8 is a flowchart of a method of connecting a main control unit to a wireless local area network using a remote control unit, according to some embodiments of the invention.

Reference is now made to FIG. 8, which is a flowchart of a method of connecting a main control unit to a wireless local area network using a remote control unit, according to some embodiments of the invention.

The method may be implemented by system 100 described above with respect to FIGS. 1A, 1B and 1C, which may be configured to implement the method.

The method may include sharing 802, by a remote control unit, a wireless internet connection having predefined identification parameters, wherein a main control unit is configured to automatically connect to the shared wireless internet connection using the predefined identification parameters (e.g., remote control unit 140 described above with respect to FIGS. 1A, 1B and 1C).

The method may include selecting 804, by the remote control unit, a wireless local area network (WLAN) to which the main control unit to be connected.

The method may include connecting 806, by the remote control unit, the main control unit to the selected WLAN.

The method may provide easy installation and initiation of the system.

Advantageously, the disclosed system and method provide a low-cost and robust means for detecting pre-drowning and drowning events in pools, for example in residential pools. The disclosed system occupies no space in an area around the pool (e.g., total underwater and underground installation), have low false alarm ratio and enhanced night vision, live view streaming, charging and communication capabilities as compared to current systems for detecting drowning events.

Figure 9:
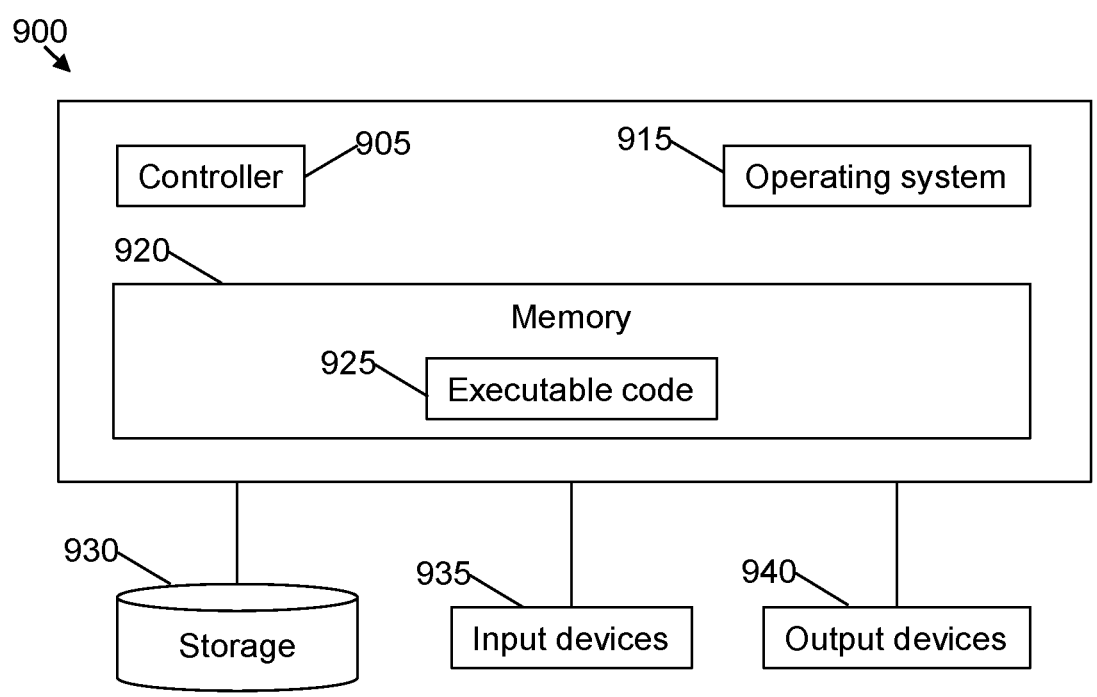
FIG. 9 is a block diagram of an exemplary computing device which may be used with embodiments of the present invention.

Reference is now made to FIG. 9, which is a block diagram of an exemplary computing device 900 which may be used with embodiments of the present invention.

Computing device 900 may include a controller or processor 905 that may be, for example, a central processing unit processor (CPU), a chip or any suitable computing or computational device, an operating system 915, a memory 920, a storage 930, input devices 935 and output devices 940.

Operating system 915 may be or may include any code segment designed and/or configured to perform tasks involving coordination, scheduling, arbitration, supervising, controlling or otherwise managing operation of computing device 900, for example, scheduling execution of programs. Memory 920 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 920 may be or may include a plurality of, possibly different, memory units. Memory 920 may store for example, instructions to carry out a method (e.g., code 925), and/or data such as user responses, interruptions, etc.

Executable code 925 may be any executable code, e.g., an application, a program, a process, task or script. Executable code 925 may be executed by controller 905 possibly under control of operating system 915. In some embodiments, more than one computing device 900 or components of device 900 may be used for multiple functions described herein. For the various modules and functions described herein, one or more computing devices 900 or components of computing device 900 may be used. Devices that include components similar or different to those included in computing device 900 may be used, and may be connected to a network and used as a system. One or more processor(s) 905 may be configured to carry out embodiments of the present invention by for example executing software or code. Storage 930 may be or may include, for example, a hard disk drive, a floppy disk drive, a Compact Disk (CD) drive, a CD-Recordable (CD-R) drive, a universal serial bus (USB) device or other suitable removable and/or fixed storage unit. In some embodiments, some of the components shown in FIG. 9 may be omitted.

Input devices 935 may be or may include a mouse, a keyboard, a touch screen or pad or any suitable input device. It will be recognized that any suitable number of input devices may be operatively connected to computing device 900 as shown by block 935. Output devices 940 may include one or more displays, speakers and/or any other suitable output devices. It will be recognized that any suitable number of output devices may be operatively connected to computing device 900 as shown by block 940. Any applicable input/output (I/O) devices may be connected to computing device 900, for example, a wired or wireless network interface card (NIC), a modem, printer or facsimile machine, a universal serial bus (USB) device or external hard drive may be included in input devices 935 and/or output devices 940.

Embodiments of the invention may include one or more article(s) (e.g., memory 920 or storage 930) such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

Figure 10A:
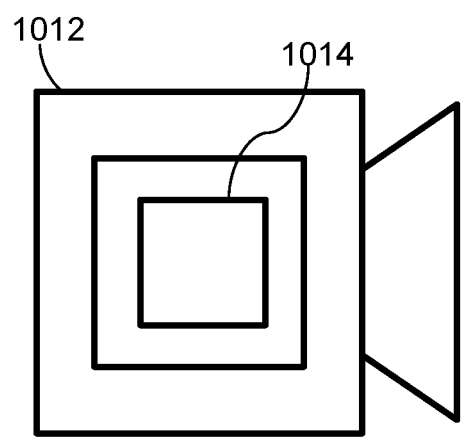
FIG. 10A is a schematic illustration of a camera for pre-drowning and drowning detection in an underwater environment, according to some embodiments of the invention.

Reference is made to FIG. 10A, which is a schematic illustration of a camera 1000 for pre-drowning and drowning detection in an underwater environment, according to some embodiments of the invention.

Camera 1000 may be installed in a pool, for example in a wall of the pool, below the waterline of the pool. Camera 1000 may be used in system 100 as described above with respect to FIGS. 1A, 1B, 1C, for example as part of camera unit 110 or standalone.

Camera 1000 may include electronic circuitry (e.g., chip) 1012. Electronic circuitry 1012 of camera 1012 may be configured to cause camera 1000 to capture a plurality of images. For example, electronic circuitry 1012 of camera 1000 may store executable code that, when executed, may cause camera 1010 to obtain the plurality of images. Camera 1000 may be an IP camera.

Camera 1000 may include a controller 1014. Controller 1014 may be included in camera 1000. Controller 1014 may be included in electronic circuitry 1012 of camera 1000. Controller 1014 may be part of electronic circuitry 1012 of camera 1000. The executable code (that when executed causes controller 1014 to perform operations as described herein) may be burned on electronic circuitry 1012 of camera 1000.

Controller 1014 may perform operations of main unit 120 as described herein or any other suitable operations. Controller 1014 may obtain coordinates of a virtual safety line indicative of in an image of the plurality of images (e.g., as described above with respect to FIGS. 1A, 1B, 1C and FIG. 3). Controller 1014 may detect a human body in an image of the plurality of images (e.g., as described above with respect to FIGS. 1A, 1B, 1C and FIGS. 4A, 4B, 4C, 4D). Controller 1014 may track the human body in the plurality of images (e.g., as described above with respect to FIGS. 1A, 1B, 1C and FIGS. 5A, 5B). Controller 1014 may track a position and/or an orientation and/or a measure of motion of the human body in the plurality of images (e.g., as described above with respect to FIGS. 1A, 1B, 1C; FIGS. 5A, 5B; and FIGS. 6A, 6B). Controller 1014 may track the position and/or the orientation of the human body with respect to the virtual safety line (e.g., as described above with respect to FIGS. 1A, 1B, 1C; FIGS. 5A, 5B; and FIGS. 6A, 6B). Based on a first subset of images of the plurality of images, the tracking and a predefined set of rules, controller 1014 may determine whether or not the human body is suspicious of undergoing a pre-drowning event or a drowning event (e.g., as described above with respect to FIGS. 1A, 1B, 1C and FIGS. 7A, 7B, 7C, 7D, 7E). Based on a second subset of images, the tracking and the predefined set of rules, controller 1014 may determine whether or not the human body is undergoing the pre-drowning event or the drowning event (e.g., as described above with respect to FIGS. 1A, 1B, 1C and FIGS. 7A, 7B, 7C, 7D, 7E).

Figure 10B:
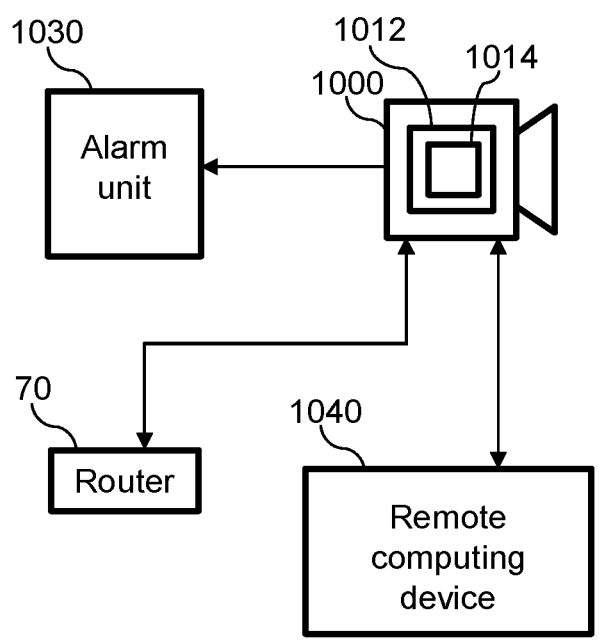
FIG. 10B is a schematic illustration of a system including the camera 1000 of FIG. 10A, according to some embodiments of the invention.

Reference is made to FIG. 10B, which is a schematic illustration of a system 1001 including camera 1000 of FIG. 10A, according to some embodiments of the invention.

System 1001 may include one or more cameras 1000 described above with respect to FIG. 10A. Camera 1000 may be connected (e.g., during installation) to a local area network (LAN) router 70 using, for example, a cable. In another example, camera 1000 may be wirelessly to LAN router 70. Camera 1000 may be connected to a power source using a cable.

System 1001 may include an alarm unit 1030. Alarm unit 1030 may be similar to alarm unit 130 described above with respect to FIGS. 1A, 1B, 1C. Alarm unit 1030 may perform operations of alarm unit 130 as described above with respect to FIGS. 1A, 1B, 1C. Controller 1014 of camera 1000 may control alarm unit 1030 to issue an alarm upon determination of the pre-drowning or the drowning event. Alarm unit 1030 may be a radiofrequency (RF)-based alarm unit, a wireless-based alarm unit (e.g., a Wi-Fi based alarm unit) or any other suitable alarm unit.

System 1001 may include a remote computing device 1040. Remote computing device 1040 may be similar to remote control unit 140 described above with respect to FIGS. 1A, 1B, 1C. Remote computing device 1040 may perform operations of remote control unit 140 as described above with respect to FIGS. 1A, 1B, 1C. Controller 1014 of camera 1000 may send a notification concerning the determination of the pre-drowning or the drowning event to remote computing device 1040. Remote computing device 1040 may be connected to camera 1000 by reading an optical label (e.g., QR code or any other suitable machine-readable optical label) disposed on camera 1000.

Figure 11:
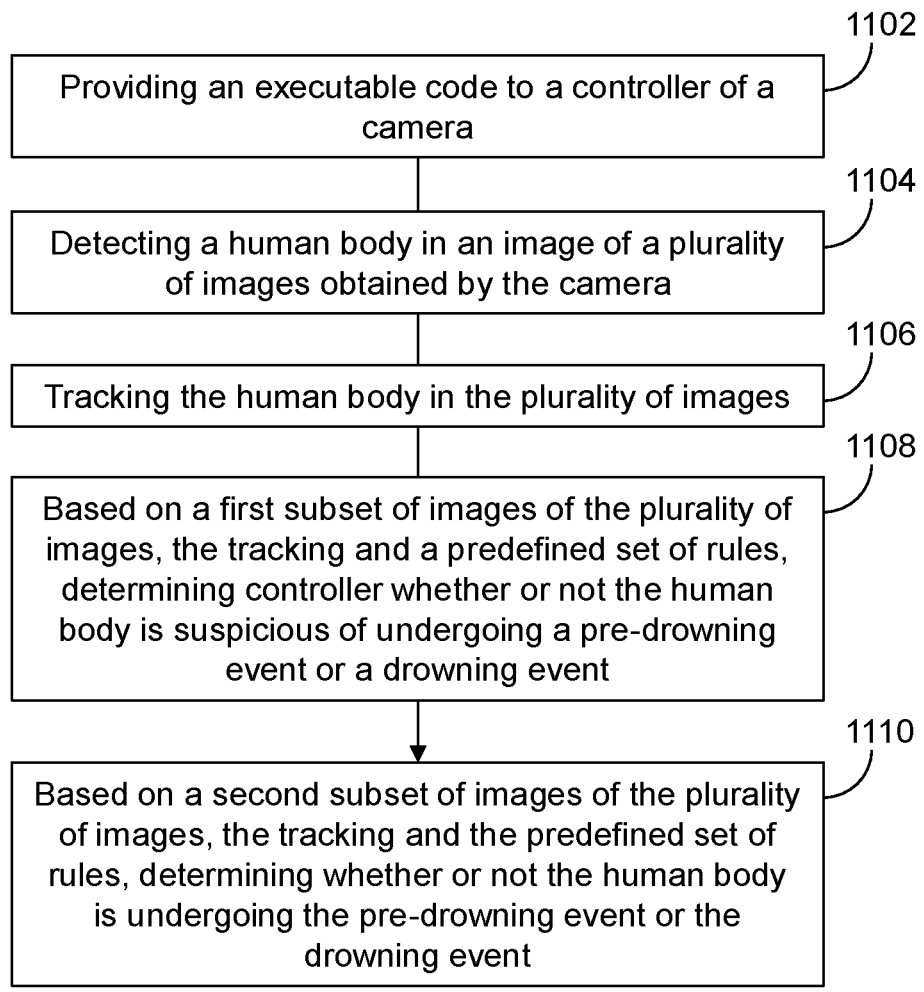
FIG. 11 is a flowchart of a method of pre-drowning and drowning detection in an underwater environment, according to some embodiments of the invention.

Reference is made to FIG. 11, which is a flowchart of a method of pre-drowning and drowning detection in an underwater environment, according to some embodiments of the invention.

The operations described with respect to FIG. 11 may be performed using camera 1000 and/or system 1001 described with respect to FIGS. 10A and 10B and/or using any other suitable equipment.

In operation 1102, executable code may be provided to a controller of a camera (e.g., controller 1014 of camera 1000 described above with respect to FIGS. 10A and 10B). The camera may be positioned in a pool, for example in a wall of the pool, below a waterline of the pool. The camera may be connected to a local area network (LAN) router using a cable or a wireless connection. The controller may be included in the camera. The controller may be included in electronic circuitry (e.g., electronic circuitry 1012) of the camera. The controller may be part of the electronic circuitry of the camera. The executed code may be burned on the electronic circuitry (e.g., chip) of the camera.

In operation 1104, a human body may be detected by the controller in an image of a plurality of images obtained by the camera (e.g., as described above with respect to FIGS. 1A, 1B, 1C and FIGS. 4A, 4B, 4C, 4D).

In operation 1106, the human body may be tracked by the controller in the plurality of images (e.g., as described above with respect to FIGS. 1A, 1B, 1C and FIGS. 5A, 5B). For example, a position and/or orientation and/or a measure of motion of the human body in the plurality of images may be tracked by the controller (e.g., as described above with respect to FIGS. 1A, 1B, 1C; FIGS. 5A, 5B; and FIGS. 6A, 6B). The position and/or the orientation of the human body may be tracked with respect to the virtual safety line (e.g., as described above with respect to FIGS. 1A, 1B, 1C; FIGS. 5A, 5B; and FIGS. 6A, 6B).

In operation 1108, it may be determined by the controller whether or not the human body is suspicious of undergoing a pre-drowning event or a drowning event based on a first subset of the plurality of images, the tracking of the human body and a predefined set of rules (e.g., as described above with respect to FIGS. 1A, 1B, 1C and FIGS. 7A, 7B, 7C, 7D, 7E).

In operation 1110, it may be determined whether or not the human body is undergoing the pre-drowning event or the drowning event based on a second subset of the plurality of images, the tracking of the human body and the predefined set of rules (e.g., as described above with respect to FIGS. 1A, 1B, 1C and FIGS. 7A, 7B, 7C, 7D, 7E).

Upon determination of the pre-drowning or the drowning event, an alarm unit may be controlled by the controller to cause the alarm unit to issue an alarm (e.g., as described above with respect to FIGS. 1A, 1B, 1C and FIG. 10B).

Upon determination of the pre-drowning or the drowning event, a notification concerning the determination of the pre-drowning or the drowning event may be sent or transmitted by the controller to a remote computing device (e.g., remote computing device 1040 described above with respect to FIG. 10B). The remote computing device may be connected to the camera by reading an optical label (e.g., QR code or any other suitable machine-readable optical label) disposed on the camera.

Figure 12:
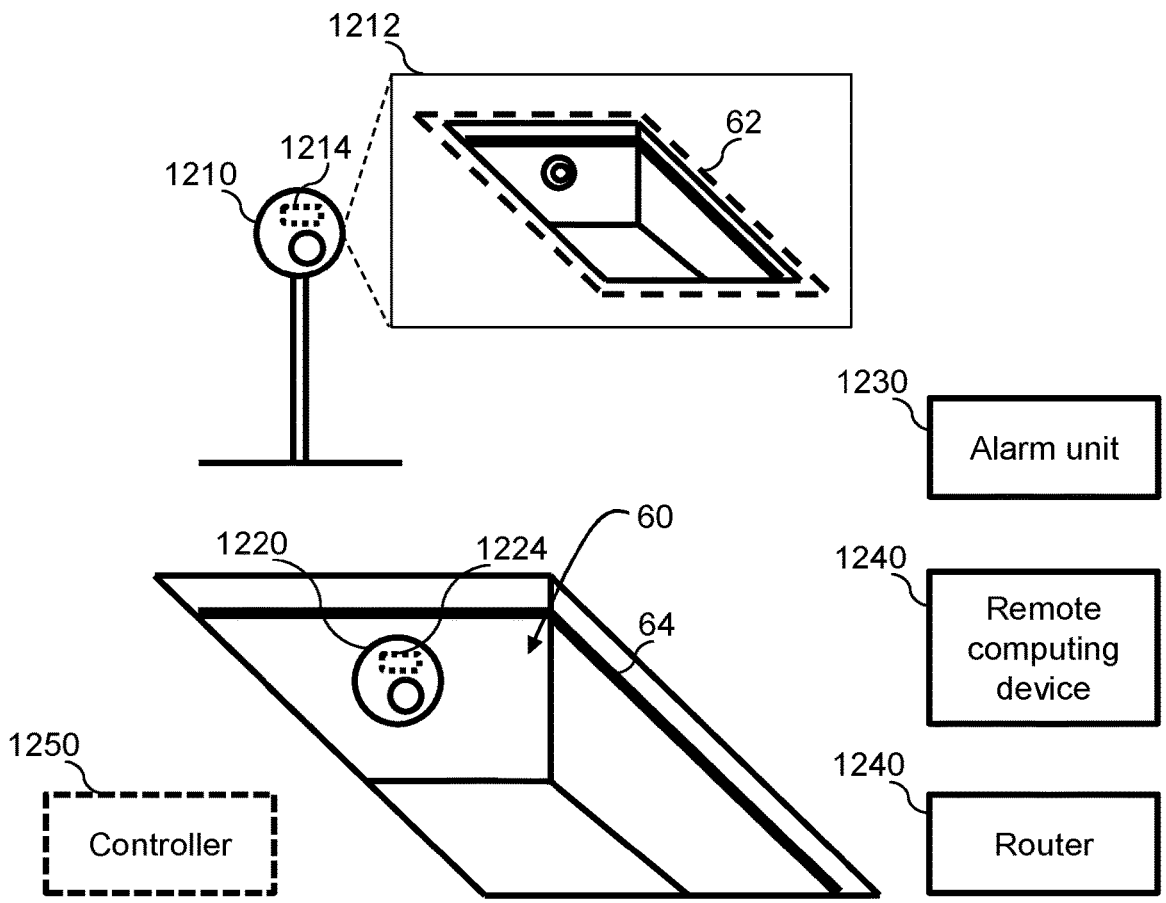
FIG. 12 a schematic illustration of a system for pre-drowning and drowning detection based on a first above-water camera and a second underwater camera, according to some embodiments of the invention.

Reference is made to FIG. 12, which a schematic illustration of a system 1200 for pre-drowning and drowning detection based on a first above-water camera 1210 and a second underwater camera 1220, according to some embodiments of the invention.

System 1200 may include a first (e.g., above-water) 1210, a second (e.g., underwater camera) 1220, an alarm unit 1230 (e.g., such as alarm unit 130 or alarm unit 1030 described hereinabove) and a remote computing device 1240 (e.g., such as remote control unit 140 or remote computing device 1040 described hereinabove).

First camera 1210 may be installed externally to a pool 60. First camera 1210 may obtain a plurality of first images of pool 60 and an area around pool 60 (e.g., an image 1212 as schematically shown in FIG. 12). First camera 1210 may be an IP camera. First camera 1210 may be connected to LAN router 70 using a cable and/or using a wireless connection. Remote computing device 1240 may be connected to first camera 1210 (e.g., during installation or at any other suitable time) by reading an optical marker (e.g., machine-readable optical marker such as QR code or any other suitable machine-readable optical marker) disposed on first camera 1210. First camera 1210 may be connected to remote computing device 1240 directly. First camera 1210 may be connected to remote computing device 1240 indirectly (e.g., via a cloud connection or any other suitable connection).

First camera 1210 may include a controller 1214. Controller 1214 may be included in first camera 1210. Controller 1214 may be included in electronic circuitry of first camera 1210. Controller 1214 may be part of the electronic circuitry of first camera 1210. The executable code (that when executed causes controller 1214 to perform operations as described herein) may be bunted on the electronic circuitry of first camera 1210.

Controller 1214 of first camera 1210 may obtain coordinates of a first virtual safety line indicative of a perimeter of pool 60. For example, controller 1214 may obtain the coordinates of first virtual safety line based on user's input (e.g., similar to obtaining coordinates of virtual safety line indicative of the waterline of the pool as described above with respect to FIGS. 1A, 1B, 1C). In another example, controller 1214 may determine the coordinates of first virtual safety line by processing at least one of the first images.

Based on an image of the plurality of first images, controller 1214 may detect a human body. Detecting the human body in the image may be by providing the image as an input to a pre-trained AI model for above-water body parts detection. The AI model for above-water body parts detection may be similar to AI model 420 but trained based on above-water images of body parts. For example, the AI model for above-water body parts detection include a neural network. The neural network may be trained using, for example: (i) a first set of positive above-water images containing body parts of human bodies, preferably at different possible positions and orientations; (ii) a second set of negative above-water images containing no body parts; and (iii) a third set of augmented positive and augmented negative above-water images. Detecting the human body in the image may further include determining which of the two or more detected body parts belong to the same human body (e.g., in a similar way as described above with respect to FIG. 4C).

Based on a subset of images of the plurality of first images, controller 1214 may determine whether or not the human body has got closer than a predefined distance to and/or has crossed first virtual safety line.

If controller 1214 determines that the human body has got closer than the predefined distance to and/or has crossed first virtual safety line, controller 1214 may control alarm unit 1230 to issue an alarm. If controller 1214 determines that the human body has got closer than the predefined distance to and/or has crossed first virtual safety line, controller 1214 may send or transmit a notification to remote computing device 1240.

System 1200 may be controlled to prevent first (e.g., above-water) camera 1210 from capturing the first images and/or to prevent alarm unit 1230 from issuing alarms based on signals and/or indications and/or notifications from first camera 1210. For example, in the case the user or anyone else is wishing to enter pool 60, the user may control, e.g., using remote computing device 1240, first camera 1210 from capturing the first images and/or control alarm unit 1230 to prevent alarm unit 1230 from issuing alarms signals and/or indications and/or notifications from first camera 1210.

Based on an image of the plurality of first images, controller 1214 may detect a human body in pool 60 (e.g., in the area surrounded by first virtual line 62 indicative of the perimeter of pool 60). Based on a subset of images of the plurality of first images, controller 1214 may track the human body in pool 60. Based on the tracking, controller 1214 may determine a measure of motion of the human body in pool 60. A measure of motion that is below a predefined motion threshold may indicate that the human body is suspicious of undergoing a drowning event and/or is undergoing the drowning event. If it is determined that that the measure of motion of the human body in pool 60 is below the predefined motion threshold, controller 1214 may control alarm unit 1230 to issue an alarm and/or transmit a respective notification to remote computing device 1240.

Second camera 1220 may be similar to camera 112 described above with respect to FIGS. 1A, 1B, 1C or camera 1000 described above with respect to FIGS. 10A, 10B. Second camera 1220 may be installed in pool 60, for example in the wall of pool 60, below a waterline 64 of pool 60. Second camera 1220 may be an IP camera. Second camera 1220 may be connected to LAN router 70 using a cable and/or using a wireless connection. Remote computing device 1240 may be connected to second camera 1220 (e.g., during installation or at any other suitable time) by reading an optical marker (e.g., machine-readable optical marker such as QR code or any other suitable machine-readable optical marker) disposed on second camera 1220.

Second camera 1220 may include a controller 1224. Controller 1224 may be included in first camera 1220. Controller 1224 may be included in electronic circuitry of second camera 1220. Controller 1224 may be part of the electronic circuitry of second first camera 1220. The executable code (that when executed causes controller 1224 to perform operations as described herein) may be burned on the electronic circuitry of second camera 1220.

Second camera 1220 may obtain a plurality of second images. Controller 1224 may obtain coordinates of a second virtual safety line indicative of in an image of the plurality of images (e.g., as described above with respect to FIGS. 1A, 1B, 1C and FIG. 3). Controller 1224 may detect a human body in an image of the plurality of images (e.g., as described above with respect to FIGS. 1A, 1B, 1C and FIGS. 4A, 4B, 4C, 4D). Controller 1224 may track the human body in the plurality of images (e.g., as described above with respect to FIGS. 1A, 1B, 1C and FIGS. 5A, 5B). Controller 1224 may track a position and/or an orientation and/or a measure of motion of the human body in the plurality of images (e.g., as described above with respect to FIGS. 1A, 1B, 1C; FIGS. 5A, 5B; and FIGS. 6A, 6B). Controller 1224 may track the position and/or the orientation of the human body with respect to the second virtual safety line (e.g., as described above with respect to FIGS. 1A, 1B, 1C; FIGS. 5A, 5B; and FIGS. 6A, 6B). Controller 1224 may determine whether or not the human body is suspicious of undergoing a pre-drowning event or a drowning event based on a first subset of images of the plurality of images, the tracking of the human body and a predefined set of rules (e.g., as described above with respect to FIGS. 1A, 1B, 1C and FIGS. 7A, 7B, 7C, 7D, 7E). Controller 1224 may determine whether or not the human body is undergoing the pre-drowning event or the drowning event based on a second subset of images of the plurality of images, the tracking of the human body and the predefined set of rules (e.g., as described above with respect to FIGS. 1A, 1B, 1C and FIGS. 7A, 7B, 7C, 7D, 7E). Controller 1224 may control alarm unit 1230 to issue an alarm upon determination of the pre-drowning or the drowning event. Controller 1214 may send a notification concerning the determination of the pre-drowning or the drowning event to remote computing device 1240.

Based on a portion of the first images, controller 1214 of first camera 1210 may count the number of human bodies in the area surrounding pool 60. Based on a portion of the second images, controller 1224 of second camera 1220 may count the number of human bodies in pool 60. The total number of human bodies in pool 60 and in the area surrounding pool 60 may be further calculated. The total number of human bodies in pool 60 and in the area surrounding pool 60 may be used to ensure that no entrance alarms are repeatedly issued for same human bodies.

System 1200 may include a controller 1250 (e.g., such as control unit 120 described above with respect to FIGS. 1A, 1B, 1C). Controller 1250 may be used in addition to controller 1214 of first camera 1210 and controller 1224 of second camera 1220. Controller 1250 may be used instead of controller 1214 of first camera 1210 and/or of controller 1224 of second camera 1220. Controller 1250 may perform at least part or all of the operation of controller 1214 of first camera 1210 and/or of controller 1224 of second camera 1220.

Advantageously, utilization of first above-water camera 1210 may provide an additional layer of safety by triggering an alarm if a human body is detected in a dangerous vicinity of pool 60 in undesired or unexpected time. In this case, issuing an alarm may prevent the human body from falling into pool 60 and thus preventing the pre-drowning and/or the drowning event from occurring. Controller 1214 of first camera 1210 and/or controller 1250 may be configured to detect human bodies rather than motion, thus preventing false alarms associated with detection of motion of non-human bodies such as cats, dogs, birds or any other moving objects.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the foregoing detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention. Some features or elements described with respect to one embodiment can be combined with features or elements described with respect to other embodiments.

Although embodiments of the invention are not limited in this regard, discussions utilizing terms such as, for example, "processing," "computing," "calculating," "determining," "establishing", "analyzing", "checking", or the like, can refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that can store instructions to perform operations and/or processes.

Although embodiments of the invention are not limited in this regard, the terms "plurality" and "a plurality" as used herein can include, for example, "multiple" or "two or more". The terms "plurality" or "a plurality" can be used throughout the specification to describe two or more components, devices, elements, units, parameters, or the like. The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

The invention claimed is:

1. A camera for pre-drowning and drowning detection in an underwater environment, the camera comprising:
a controller configured to:
in an image of a plurality of images captured by the camera, detect a human body;
in the plurality of images, track the human body;
based on a first subset of the plurality of images, the tracking and a predefined set of rules, determine whether or not the human body is suspicious of undergoing a pre-drowning event or a drowning event; and
based on a second subset of images, the tracking and the predefined set of rules, determine whether or not the human body is undergoing the pre-drowning event or the drowning event.

2. The camera of claim 1, wherein the controller is comprised in the electronic circuitry of the camera.

3. The camera of claim 1, wherein the camera is an IP camera configured to be connected to a local area network router wirelessly or using a cable.

4. The camera of claim 1, wherein the controller is configured to control an alarm unit to issue an alarm upon determination that the human body is undergoing the pre-drowning event or the drowning event.

5. The camera of claim 1, wherein the controller is configured to transmit a notification about the determination that the human body is undergoing the pre-drowning event or the drowning event to a remote computing device.

6. The camera of claim 1, wherein a remote computing device is connectable to the camera by reading a machine-readable optical label disposed on the camera.

7. The camera of claim 1, wherein the controller is configured to track the human body by determining a position and orientation of the human body with respect to a virtual safety line indicative of a waterline in a pool and a measure of motion of the human body.

8. The camera of claim 1, wherein the controller is configured to detect the human body in the image by detecting two or more body parts and determining that the two or more body parts belong to the same human body.

9. The camera of claim 8, wherein the controller is configured to detect the two or more human body parts by providing the image as an input to a pretrained artificial intelligence (AI) model.

10. The camera of claim 1, wherein the controller is configured to determine that the human body is suspicious of undergoing the pre-drowning event if:
a head of the human body is detectable in the images of the first subset and the head is below a virtual safety line in the images of the first subset, the virtual safety line being indicative of a waterline in a pool;
an orientation of the human body in the images of the first subset is substantially vertical;
a measure of motion of the human body in a vertical direction is greater than a measure of motion of the human body in a horizontal direction in the images of the first subset; and
a total measure of motion of the human body in the images of the first subset is below a predefined motion threshold.

11. The camera of claim 1, wherein the controller is configured to determine that the human body is suspicious of undergoing the drowning event if:
an orientation of the human body in the images of the first subset is substantially horizontal;
the human body is below a virtual safety line in the images of the first subset, the virtual line being indicative of a waterline in a pool; and
a total measure of motion of the human body in the images of the first subset is below a predefined motion threshold.

12. The camera of claim 1, wherein the controller is configured to determine that the human body is suspicious of undergoing the drowning event if:
only one body part of the human body is detectable in the images of the first subset;
a vertical distance between that body part and a virtual safety line is above a predefined distance threshold in the images of the first subset, the virtual line being indicative of a waterline in a pool; and
a total measure of motion of that body part in the images of the first subset is below a predefined motion threshold.

13. A method of pre-drowning and drowning detection in an underwater environment, the method comprising:
providing executable code to a controller of the camera; and
by the controller, executing the executable code to:
in an image of a plurality of images captured by the camera, detect a human body;
in the plurality of images, track the human body;
based on a first subset of the plurality of images, the tracking and a predefined set of rules, determine whether or not the human body is suspicious of undergoing a pre-drowning event or a drowning event; and
based on a second subset of images, the tracking and the predefined set of rules, determine whether or not the human body is undergoing the pre-drowning event or the drowning event.

14. The method of claim 13, comprising connecting the camera to a local area network router wirelessly or using a cable.

15. The method of claim 13, comprising, by the controller, at least one of:
controlling an alarm unit to issue an alarm if it is determined that the human body is undergoing the pre-drowning event or the drowning event; and
transmitting to a remote computing device a notification that the human body is undergoing the pre-drowning event or the drowning event.

* * * * *